United States Patent
Cluff et al.

(10) Patent No.: US 11,914,844 B2
(45) Date of Patent: Feb. 27, 2024

(54) AUTOMATED PROCESSING AND DYNAMIC FILTERING OF CONTENT FOR DISPLAY

(71) Applicant: Truist Bank, Charlotte, NC (US)

(72) Inventors: Kenneth William Cluff, Powhatan, VA (US); Harold Thomas Wood, III, Matthews, NC (US); Peter Councill, Richmond, VA (US); James Xu, Raleigh, NC (US)

(73) Assignee: TRUIST BANK, Charlotte, NC (US)

( * ) Notice: Subject to any disclaimer, the term of this patent is extended or adjusted under 35 U.S.C. 154(b) by 0 days.

(21) Appl. No.: 17/815,722

(22) Filed: Jul. 28, 2022

(65) Prior Publication Data
US 2023/0341999 A1   Oct. 26, 2023

Related U.S. Application Data

(63) Continuation of application No. 17/729,495, filed on Apr. 26, 2022, and a continuation of application No. 17/729,418, filed on Apr. 26, 2022.

(51) Int. Cl.
*G06F 17/00* (2019.01)
*G06F 3/0482* (2013.01)
(Continued)

(52) U.S. Cl.
CPC ........ *G06F 3/0482* (2013.01); *G06F 3/04847* (2013.01); *G06F 40/30* (2020.01); *G06N 3/08* (2013.01)

(58) Field of Classification Search
CPC .... G06F 3/0482; G06F 3/04847; G06F 40/30; G06N 3/08
See application file for complete search history.

(56) References Cited

U.S. PATENT DOCUMENTS 8,725,775 B2 * 5/2014 Gong .................. G06F 16/9038
                                                                 715/744
9,336,483 B1 * 5/2016 Abeysooriya ............ G06N 3/08
(Continued)

FOREIGN PATENT DOCUMENTS

CN          108431814 A  *  8/2018   ......... G06F 17/2247
CN          110210413 A      9/2019
(Continued)

OTHER PUBLICATIONS

Yang, Kai, "Characterizing Heterogeneous Internet of Things Devices at Internet Scale Using Semantic Extraction", IEEE Internet of Things Journal, vol. 9, Issue 7, pp. 5434-5446, Sep. 6, 2021. (Year: 2021).*

(Continued)

*Primary Examiner* — Laurie A Ries
(74) *Attorney, Agent, or Firm* — Michael A. Springs, Esq.; Shumaker, Loop & Kendrick, LLP; Patrick B. Horne

(57) ABSTRACT

Disclosed are systems and methods that automatically classify, segment, and parse content data using artificial intelligence and natural language processing technology, and generate graphical user interfaces that allow end users to dynamically filter content data for display. The systems processes volumes of content data to identify interrogative data, content sources that generated the interrogative data, and subject identifiers relating to the content data. The system generates graphical user interfaces that allow end users to effectively filter the data by choosing between layouts that display one or more of the various categories of data, including the interrogative data, content source identifiers, and/or subject identifiers. The user interfaces include content view input functions that utilizes mapping data to locate and extract segments of the underlying content data from which displayed data is derived, thereby allowing end (Continued)

users to expediently review both the aggregated and reduced content data and the underlying source data.

20 Claims, 10 Drawing Sheets

(51) Int. Cl.
  *G06F 3/04847* (2022.01)
  *G06N 3/08* (2023.01)
  *G06F 40/30* (2020.01)

(56) References Cited

U.S. PATENT DOCUMENTS

| | | | |
|---|---|---|---|
| 9,619,748 B1* | 4/2017 | Commons | G06N 3/045 |
| 9,965,548 B2* | 5/2018 | Haggar | G06F 16/3329 |
| 10,242,323 B2* | 3/2019 | Battersby | G06N 20/10 |
| 10,331,624 B2* | 6/2019 | Levesque | G06F 16/13 |
| 10,410,111 B2* | 9/2019 | Husain | G06N 5/01 |
| 10,685,051 B2* | 6/2020 | Ludlow | G06F 3/04842 |
| 10,819,664 B2 | 10/2020 | Nahum | |
| 11,645,860 B2 | 5/2023 | Cetintas | |
| 2014/0298199 A1 | 10/2014 | Johnson, Jr. | |
| 2015/0081611 A1* | 3/2015 | Shivakumar | G06F 40/103 706/46 |
| 2016/0274764 A1* | 9/2016 | Moreau | G06F 40/106 |
| 2017/0116204 A1* | 4/2017 | Davulcu | G06F 16/355 |
| 2019/0171915 A1* | 6/2019 | Reicher | G06V 30/194 |
| 2019/0361966 A1* | 11/2019 | Munro | G06Q 50/01 |
| 2020/0042825 A1* | 2/2020 | Nguyen | G06N 3/044 |
| 2020/0174630 A1* | 6/2020 | Rosenberg | G09B 5/00 |
| 2020/0351225 A1 | 11/2020 | Lenchner | |
| 2020/0364553 A1* | 11/2020 | Amos | G06N 3/08 |
| 2021/0089860 A1 | 3/2021 | Heere | |
| 2021/0224685 A1* | 7/2021 | Mitra | G06N 3/08 |
| 2021/0258401 A1 | 8/2021 | Sullivan | |
| 2022/0050963 A1 | 2/2022 | Shipman | |
| 2022/0100767 A1* | 3/2022 | Ghoshal | G06F 40/237 |
| 2022/0108134 A1* | 4/2022 | Marrero | G06V 10/764 |
| 2022/0147698 A1 | 5/2022 | Revankar | |
| 2022/0415327 A1 | 12/2022 | Fowers | |
| 2023/0215576 A1 | 7/2023 | Loupy | |

FOREIGN PATENT DOCUMENTS

| | | | | |
|---|---|---|---|---|
| CN | 113692591 A | * | 11/2021 | G06K 9/6256 |
| WO | WO-2016133543 A1 | * | 8/2016 | G06F 16/2425 |
| WO | WO-2019000051 A1 | * | 1/2019 | |

OTHER PUBLICATIONS

Zhu, Wei-Dong (Jackie), et al., "IBM Watson Content Analytics: Discovering Actionable Insight from Your Content", IBM Redbooks, ISBN 0738439428, Jul. 2014 (Year: 2014).

* cited by examiner

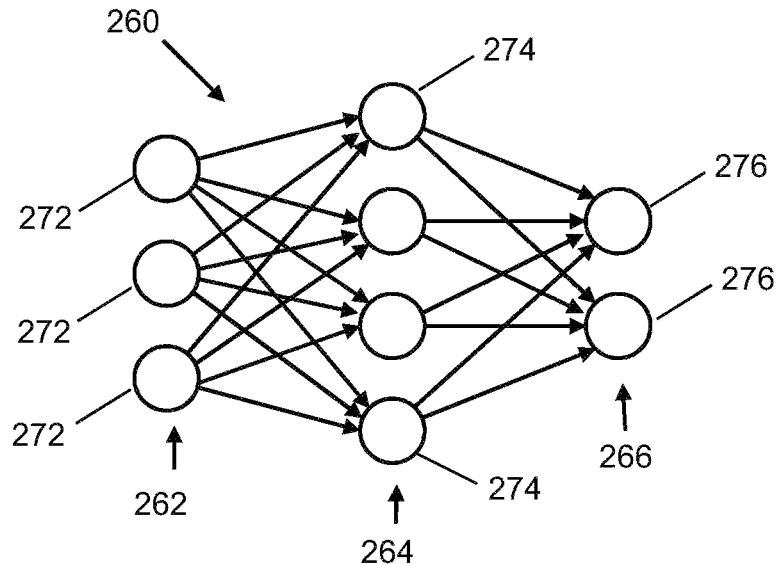
FIG. 2A
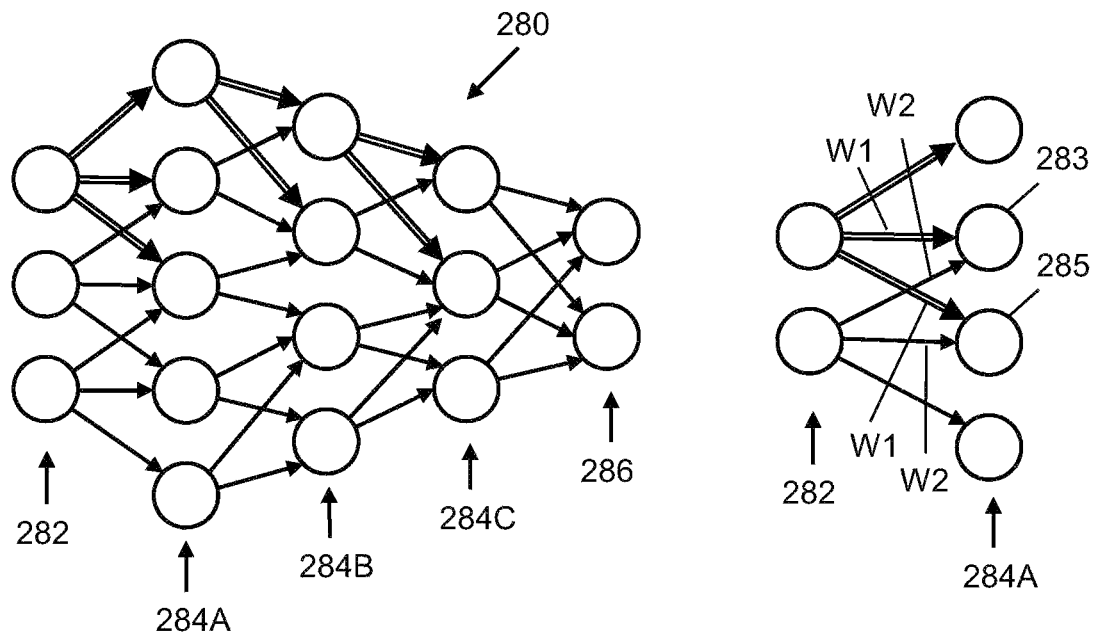
FIG. 2B     FIG. 2C

AUTOMATED PROCESSING AND DYNAMIC FILTERING OF CONTENT FOR DISPLAY

CROSS REFERENCE TO RELATED APPLICATIONS

This application is a continuation application tracing priority to co-pending U.S. application Ser. No. 17/729,495 filed on Apr. 26, 2022, the entirety of which is herein expressly incorporated by reference, and tracing priority to co-pending U.S. application Ser. No. 17/729,418 also filed on Apr. 26, 2022, the entirety of which is also herein expressly incorporated by reference.

TECHNICAL FIELD AND BACKGROUND

The present invention relates generally to the field of automated processing of alphanumeric content data. More particularly, the invention relates to systems and methods that automatically classify, segment, and parse alphanumeric content data using artificial intelligence and natural language processing technology, and systems and methods that generate graphical user interfaces that allow end users to dynamically filter alphanumeric content data for display.

Conventional techniques for analyzing alphanumeric content include manually reviewing and summarizing content displayed in a graphical user interface, searching the content using key word searching techniques, conducting word or page counts, and analyzing time stamps of certain events, such as when certain subjects are addressed. Conventional analysis techniques are time and labor intensive and fall short of making the content more accessible or providing valuable, in-depth insights, such as measuring engagement among multiple participants in content that represents an interactive verbal or written exchange.

It is, therefore, an object of the present invention to provide systems and methods that automate the processing of alphanumeric content data using artificial intelligence and natural language processing ("NPL") technology. The automated processing classifies, segments, and parses content to make the content more accessible to end users through graphical user interfaces ("GUIs") that allow end users to filter content for display and to view analytical insights that do not appear within the alphanumeric content data itself.

SUMMARY

According to one embodiment, a system for dynamic filtering and display of content data includes a provider computing device that processes alphanumeric content data through a content aggregation and reduction service software application. The content aggregation and reduction service software application performs an interrogative analysis that generates interrogative data comprising one or more interrogatories (i.e., questions contained in the content data, as recognized using NPL technology) and source identifier data for each of the interrogatories (i.e., conversation participants that generated the questions). The content aggregation and reduction service software application also performs a subject classification analysis to generate subject identifier data (i.e., topics identified in the content data using NPL technology). The results of the interrogative analysis and the subject classification analysis are passed to an end user computing device for display on a Content Explorer GUI.

The Content Explorer GUI includes a "View Content" input function that allows end users to view segments of underlying content data. When the View Content input function is selected, the end user computing device transmits a segmented content command to the content aggregation and reduction service, which processes the command by extracting relevant segments of the underlying content data. End users can effectively segment the content data by using the View Content input function to display portions, or segments, of the underlying content data that contain particular interrogatories, content sources, and subjects addressed in the content data.

In another embodiment, end users can select a Layout Selection input function to choose between different layouts that show the interrogatories, content sources, or subject identifiers. The interrogatories, content sources, or subject identifiers can be assigned weights by determining "weighting data" that represents a measure of significance for the underlying data. The weighting data can be determined, for instance, by analyzing the frequency of the observed information in the underlying content data. The weighting data can be displayed to end users through a Content Explorer GUI by, for example, showing certain subject identifiers or source identifiers as being larger or smaller according to relative significance. End users also have access to a Session Selection command that allows end users to display different sources of content data.

The interrogative and subject classification analyses are performed using neural network technology. Suitable neural networks include convolutional neural networks and recurrent neural networks. In one embodiment, the analyses are performed by a convolutional neural networks having at least three intermediate layers and that implement a Latent Dirichlet Allocation model.

BRIEF DESCRIPTION OF THE DRAWINGS

Features, aspects, and advantages of the present invention are better understood when the following detailed description of the invention is read with reference to the accompanying figures, in which:

FIG. 2A is a diagram of a feedforward network, according to at least one embodiment, utilized in machine learning.

FIG. 2B is a diagram of a convolution neural network, according to at least one embodiment, utilized in machine learning.

FIG. 2C is a diagram of a portion of the convolution neural network of FIG. 2B, according to at least one embodiment, illustrating assigned weights at connections or neurons.

DETAILED DESCRIPTION

Figure 1:
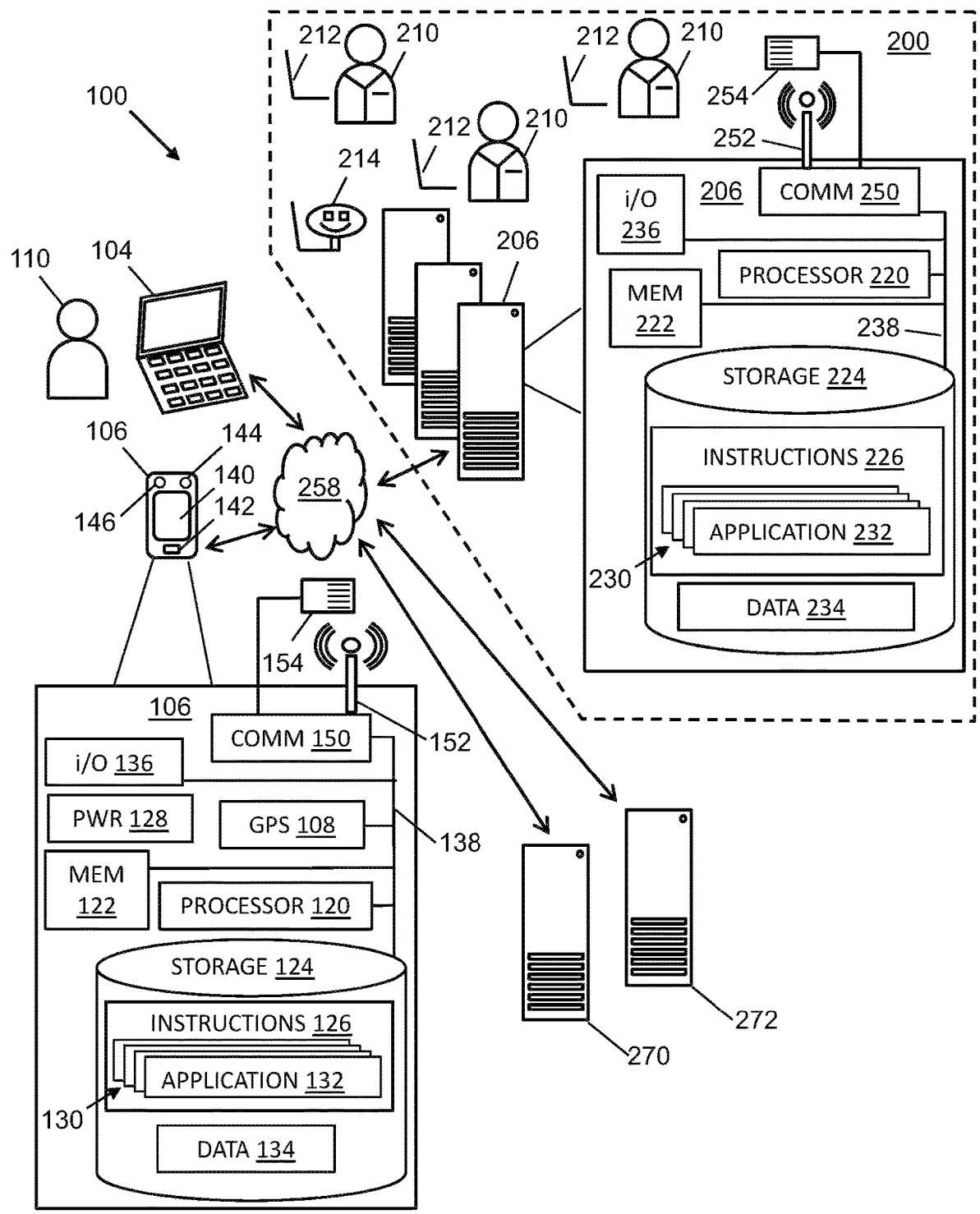
FIG. 1 is an example system diagram according to one embodiment.

The present invention will now be described more fully hereinafter with reference to the accompanying drawings in which example embodiments of the invention are shown. However, the invention may be embodied in many different forms and should not be construed as limited to the representative embodiments set forth herein. The exemplary embodiments are provided so that this disclosure will be both thorough and complete and will fully convey the scope of the invention and enable one of ordinary skill in the art to make, use, and practice the invention. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

It will be understood that relative terms are intended to encompass different orientations or sequences in addition to the orientations and sequences depicted in the drawings and described herein. Relative terminology, such as "substantially" or "about," describe the specified devices, materials, transmissions, steps, parameters, or ranges as well as those that do not materially affect the basic and novel characteristics of the claimed inventions as whole (as would be appreciated by one of ordinary skill in the art).

The terms "coupled," "fixed," "attached to," "communicatively coupled to," "operatively coupled to," and the like refer to both: (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

As used herein, the terms "enterprise" or "provider" generally describes a person or business enterprise that hosts, maintains, or uses the disclosed systems and methods. The term "content" is used to generally refer to alphanumeric text in digital form and can be used interchangeably with the terms alphanumeric content data, alphanumeric text content, alphanumeric textual content data, content data, textual content data, textual data, and text content data. These terms for content can be used interchangeably with the term "transcript data" where the terms are being used to refer to a written digital record, in text form, of a single speaker or a written or verbal interaction between multiple participants in a conversation or discussion. The term "participants" is used interchangeably with the term "content sources" and refers to humans or automated software technology (e.g., a chat bot) that generate linguistic expressions of ideas that can be processed using artificial intelligence and natural language processing technologies.

Embodiments are described with reference to flowchart illustrations or block diagrams of methods or apparatuses where each block or combinations of blocks can be implemented by computer-readable instructions (i.e., software). The term apparatus includes systems and computer program products. The referenced computer-readable software instructions may be provided to a processor of a general purpose computer, special purpose computer, or other programmable data processing apparatus to produce a particular machine. The instructions, which execute via the processor of the computer or other programmable data processing apparatus, create mechanisms for implementing the functions specified in this specification and attached figures.

The computer-readable instructions are loaded onto a computer or other programmable data processing apparatus to cause a series of operational steps to be performed on the computer or other programmable apparatus to produce a computer-implemented process such that the instructions, which execute on the computer or other programmable apparatus, provide steps for implementing the functions specified in the attached flowchart(s) or block diagram(s). Alternatively, computer software implemented steps or acts may be combined with operator or human implemented steps or acts in order to carry out an embodiment of the disclosed systems and methods.

The computer-readable software instructions may also be stored in a computer-readable memory that can direct a computer or other programmable data processing apparatus to function in a particular manner. In this manner, the instructions stored in the computer-readable memory produce an article of manufacture that includes the instructions, which implement the functions described and illustrated herein.

Disclosed are systems and methods for automatically processing alphanumeric content data by classifying, segmenting, and parsing alphanumeric text content using artificial intelligence and natural language processing technology, and systems and methods that generate graphical user interfaces that allow end users to dynamically filter content for display. The example embodiments discussed herein are generally described with reference to content data generated from a transcript of a written or verbal interactive exchange between conversation participants or "content sources." Examples of content data include, but are not limited to, an exchange of instant chat messages between two or more participants or recorded audio data generated during a conference call (e.g., a quarterly "earnings call" by a commercial enterprise), a radio broadcast, or a video broadcast. Those of skill in the art will appreciate that the example embodiments are not intended to be limiting, and the systems and methods can be applied to other types of alphanumeric content data, such as an analysis of news articles, webpages, or academic papers.

The content data is analyzed using natural language processing techniques that are implemented by artificial intelligence technology, such as trained neural networks. The resulting outputs can include, without limitation: (i) a list of questions or interrogatories posed during the underlying exchange between participants; (ii) the identities of conversation participants or "content sources;" (iii) entity affiliations and job titles relating to content sources (e.g., a person having a title of "analyst" who works at "Acme, Inc.;" (iv) a list of subjects addressed within the content data; (v) weighting data showing the relative importance or engagement associated with certain interrogatories, subjects, or content sources (e.g., a question that generated significant discussion); and (vi) mapping data that links elements of the foregoing data, such as a pointer to a memory location where a particular question can be found within the content data.

The outputs are stored to a relational database so that certain elements of the output remain associated or linked. For example, each interrogatory can be stored to a relational database in a manner that associates the interrogatories with the content source (i.e., the person who asked the question), the subject of the interrogatory, and relative engagement generated by the interrogatory (e.g., a score that represents whether the question generated significant discussion). The mapping data ensures that end users can conveniently retrieve and review underlying content data, such as a question and resulting discussion, using interfaces such as those discussed below.

System Level Description

As shown in FIG. 1, a hardware system 100 configuration according to one embodiment generally includes a user 110 that benefits through use of services and products offered by a provider through an enterprise system 200. The user 110 accesses services and products by use of one or more user computing devices 104 & 106. The user computing device can be a larger device, such as a laptop or desktop computer 104, or a mobile computing device 106, such as smart phone or tablet device with processing and communication capabilities. The user computing device 104 & 106 includes integrated software applications that manage device resources, generate user interfaces, accept user inputs, and facilitate communications with other devices, among other functions. The integrated software applications can include an operating system, such as Linux®, UNIX®, Windows®, macOS®, iOS®, Android®, or other operating system compatible with personal computing devices.

The user 110 can be an individual, a group, or an entity having access to the user computing device 104 & 106. Although the user 110 is singly represented in some figures, at least in some embodiments, the user 110 is one of many, such as a market or community of users, consumers, customers, business entities, government entities, and groups of any size.

The user computing device includes subsystems and components, such as a processor 120, a memory device 122, a storage device 124, or power system 128. The memory device 122 can be transitory random access memory ("RAM") or read-only memory ("ROM"). The storage device 124 includes at least one of a non-transitory storage medium for long-term, intermediate-term, and short-term storage of computer-readable instructions 126 for execution by the processor 120. For example, the instructions 126 can include instructions for an operating system and various integrated applications or programs 130 & 132. The storage device 124 can store various other data items 134, including, without limitation, cached data, user files, pictures, audio and/or video recordings, files downloaded or received from other devices, and other data items preferred by the user, or related to any or all of the applications or programs.

The memory device 122 and storage device 124 are operatively coupled to the processor 120 and are configures to store a plurality of integrated software applications that comprise computer-executable instructions and code executed by the processing device 120 to implement the functions of the user computing device 104 & 106 described herein. Example applications include a conventional Internet browser software application and a mobile software application created by the provider to facilitate interaction with the provider system 200.

The integrated software applications also typically provide a graphical user interface ("GUI") on the user computing device display screen 140 that allows the user 110 to utilize and interact with the user computing device. Example GUI display screens are depicted in the attached figures. The GUI display screens may include features for displaying information and accepting inputs from users, such as text boxes, data fields, hyperlinks, pull down menus, check boxes, radio buttons, and the like. One of ordinary skill in the art will appreciate that the exemplary functions and user-interface display screens shown in the attached figures are not intended to be limiting, and an integrated software application may include other display screens and functions.

The processing device 120 performs calculations, processes instructions for execution, and manipulates information. The processing device 120 executes machine-readable instructions stored in the storage device 124 and/or memory device 122 to perform methods and functions as described or implied herein. The processing device 120 can be implemented as a central processing unit ("CPU"), a microprocessor, a graphics processing unit ("GPU"), a microcontroller, an application-specific integrated circuit ("ASIC"), a programmable logic device ("PLD"), a digital signal processor ("DSP"), a field programmable gate array ("FPGA"), a state machine, a controller, gated or transistor logic, discrete physical hardware components, and combinations thereof. In some embodiments, particular portions or steps of methods and functions described herein are performed in whole or in part by way of the processing device 120. In other embodiments, the methods and functions described herein include cloud-based computing such that the processing device 120 facilitates local operations, such communication functions, data transfer, and user inputs and outputs.

The user computing device 104 & 106 incorporates an input and output system 136 operatively coupled to the processor device 120. Output devices include a display 140, which can be, without limitation, a touch screen of the mobile device 106 that serves both as an output device. The touch-screen display provides graphical and text outputs for viewing by one or more users 110 while also functioning as an input device, by providing virtual buttons, selectable options, a virtual keyboard, and other functions that, when touched, control the user computing device. The user output devices can further include an audio device, like a speaker 144.

The user computing device 104 & 106 may also include a positioning device 108, such as a global positioning system device ("GPS") that determines a location of the user computing device. In other embodiments, the positioning device 108 includes a proximity sensor or transmitter, such as an RFID tag, that can sense or be sensed by devices proximal to the user computing device 104 & 106.

A system intraconnect 138, such as a bus system, connects various components of the mobile device 106. The user computing device 104 & 106 further includes a communication interface 150. The communication interface 150 facilitates transactions with other devices and systems to provide two-way communications and data exchanges through a wireless communication device 152 or wired connection 154. Communications may be conducted via various modes or protocols, such as through a cellular network, wireless communication protocols using IEEE 802.11 standards. Communications can also include short-range protocols, such as Bluetooth or Near-field communication protocols. Communications may also or alternatively be conducted via the connector 154 for wired connections such by USB, Ethernet, and other physically connected modes of data transfer.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210 act on behalf of the provider, such as customer service representatives, advisors, managers, and sales team members.

Human agents 210 utilize agent computing devices 212 to interface with the provider system 200. The agent computing devices 212 can be, as non-limiting examples, computing devices, kiosks, terminals, smart devices such as phones, and devices and tools at customer service counters and windows at POS locations. In at least one example, the diagrammatic representation and above-description of the components of the user computing device 104 & 106 in FIG. 1 applies as well to the agent computing devices 212. As used herein, the general term "end user computing device" can be used to refer to either the agent computing device 212 or the user computing device 110 depending on whether the agent (as an employee or affiliate of the provider) or the user (as a customer or consumer) is utilizing the disclosed systems and methods to segment, parse, filter, analyze, and display content data.

Human agents 210 interact with users 110 or other agents 212 by phone, via an instant messaging software application, or by email. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components, such as a processor device 220, an input-output system 236, an intraconnect bus system 238, a communication interface 250, a wireless device 252, a hardwire connection device 254, a transitory memory device 222, and a non-transitory storage device 224 for long-term, intermediate-term, and short-term storage of computer-readable instructions 226 for execution by the processor device 220. The instructions 226 can include instructions for an operating system and various software applications or programs 230 & 232. The storage device 224 can store various other data 234, such as cached data, files for user accounts, user profiles, account balances, and transaction histories, files downloaded or received from other devices, and other data items required or related to the applications or programs 230 & 232.

The network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations.

The network 258 may be or include an enterprise or secured network, or may be implemented, at least in part, through one or more connections to the Internet. A portion of the network 258 may be a virtual private network ("VPN") or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100.

External systems 270 and 272 represent any number and variety of data sources, users, consumers, customers, enterprises, and groups of any size. In at least one example, the external systems 270 and 272 represent remote terminal utilized by the enterprise system 200 in serving users 110. In another example, the external systems 270 and 272 represent electronic systems for processing payment transactions. The system may also utilize software applications that function using external resources 270 and 272 available through a third-party provider, such as a Software as a Service ("SaasS"), Platform as a Service ("PaaS"), or Infrastructure as a Service ("IaaS") provider running on a third-party cloud service computing device. For instance, a cloud computing device may function as a resource provider by providing remote data storage capabilities or running software applications utilized by remote devices.

The embodiment shown in FIG. 1 is not intended to be limiting, and one of ordinary skill in the art will appreciate that the system and methods of the present invention may be implemented using other suitable hardware or software configurations. For example, the system may utilize only a single computing system 206 implemented by one or more physical or virtual computing devices, or a single computing device may implement one or more of the computing system 206, agent computing device 206, or user computing device 104 & 106.

Capturing Content

The provider system can be configured to generate content data manually or to obtain content data from a third party source, such as a cloud storage service or remote database. To generate content data manually, a provider agent utilizes a computing device to accesses a remote third party system to stream or download audio data, such as a live broadcast of a multi-person discussion streamed over the Internet.

The agent accesses the third party system using a software application compatible with the third party system that can be integrated with the agent computing device, such as an integrated mobile software application or an application programmable interface ("API") software application that facilitates communication between software and systems by mapping computer-readable commands and data formats between systems. In another embodiment, the agent computing device accesses the third party system using an Internet browser software application to access a web-based software interface.

Captured audio data is stored to the provider system and transcribed into written text data using a speech-to-text software application. In some embodiments, the speech-to-text conversion is performed by a third party, and the provider system downloads and stores the alphanumeric content data directly from the remote third party source.

The content data can be associated with one or more categories of metadata and stored to a database on the provider system. Content metadata can include, for example: (i) timestamp data, such as the date and time when the underlying content data was created; (ii) source identifier data that identifies one or more participants to an interactive exchange captured by the content data, which can include a name, an affiliated employer or business, or a job title or role; (iv) owner identifier data that identifies owner of the content data; (v) content identifier data that identifies the purpose or overall subject of the content data (e.g., "fourth quarter earnings call," or "new product launch demonstration"); or (vi) other types of data useful for processing the content data.

A content aggregation and reduction ("CAR") service processes the content data to identify interrogatories (i.e., questions), subjects addressed within the content data, source identifiers (e.g., names of conversation participants), sentiment data, and weighting data indicating the relative importance of subjects, content sources, and interrogatories. The data and information generated by the content aggregation and reduction service can output to novel graphical user interfaces that make the content data more accessible to end users and that reveal analytical insights that could not be previously achieved with conventional content analysis techniques. The content aggregation and reduction service can be implemented by a separate, dedicated computing device, or implemented as an integrated software application running on a computing device that is also running other applications (e.g., a network server).

Natural Language Processing

The content aggregation and reduction service processes the content data using natural language processing technology that is implemented by one or more artificial intelligence software applications and systems. The artificial intelligence software and systems are in turn implemented using neural networks. Iterative training techniques and training data instill neural networks with an understanding of individual words, phrases, subjects, sentiments, and parts of speech. As an example, training data is utilized to train a neural network to recognize that phrases like "interest rates," "rate hikes," or "bond yields" all relate to the same general subject matter when the words are observed in proximity to one another at a significant frequency of occurrence.

The content aggregation and reduction service utilizes one or more known techniques to perform a subject classification analysis that identifies subject classification data. Suitable known techniques can include Latent Semantic Analysis ("LSA"), Probabilistic Latent Semantic Analysis ("PLSA"), Latent Dirichlet Allocation ("LDA"), or a Correlated Topic Model ("CTM"). The content data is first pre-processes using a reduction analysis to create reduced content data, which is streamlined by performing one or more of the following operations, including: (i) tokenization to transform the content data into a collection of words or key phrases having punctuation and capitalization removed; (ii) stop word removal where short, common words or phrases such as "the" or "is" are removed; (iii) lemmatization where words are transformed into a base form, like changing third person words to first person and changing past tense words to present tense; (iv) stemming to reduce words to a root form, such as changing plural to singular; and (v) hyponymy and hypernym replacement where certain words are replaced with words having a similar meaning so as to reduce the variation of words within the content data.

In one embodiment, the content aggregation and reduction service processes the reduced content data by performing a Latent Drichlet Allocation ("LDA") analysis to identify subject classification data that includes one or more subject identifiers (e.g., topics addressed in the underlying content data). The analysis is run on content data that represents one or more "documents," "sessions," or "instances" of content data, such as separate broadcasts or telephone conferences that are saved to electronic storage as separate data files.

Performing the LDA analysis on the reduced content data may include transforming the content data into an array of text data representing key words or phrases that represent a subject (e.g., a bag-of-words array) and determining the one or more subjects through analysis of the array. Each cell in the array can represent the probability that given text data relates to a subject. A subject is then represented by a specified number of words or phrases having the highest probabilities (i.e., the words with the five highest probabilities), or the subject is represented by text data having probabilities above a predetermined subject probability threshold.

In other embodiments, subject may each include one or more subject vectors, where each subject vector includes one or more identified keywords within the reduced content data as well as a frequency of the one or more keywords within the reduced textual data. The subject vectors are analyzed to identify words or phrases that are included in a number of subject vectors having a frequency below a specified threshold level that are removed from the subject vectors. In this manner, the subject vectors are refined to exclude text data less likely to be related to a given subject. To reduce an effect of spam, the subject vectors may be analyzed, such that if one subject vector is determined to use text data that is rarely used in other subject vectors, then the text data is marked as having a poor subject assignment and is removed from the subject vector.

Further, in one embodiment, any unclassified content data is processed to produce reduced content data. Then words within the reduced content data are mapped to integer values, and the content data is turned into a bag-of-words that includes integer values and the number of times the integers occur in content data. The bag-of-words is turned into a unit vector, where all the occurrences are normalized to the overall length. The unit vector may be compared to other subject vectors produced from an analysis of content data by taking the dot product of the two unit vectors. All the dot products for all vectors in a given subject are added together to provide a strength score for the given subject, which is taken as subject weighting data.

To illustrate generating subject weighting data, for any given subject there may be numerous subject vectors. Assume that for most of subject vectors, the dot product will be close to zero—even if the given content data addresses the subject at issue. Since there are some subjects with numerous subject vectors, there may be numerous small dot products that are added together to provide a significant score. Put another way, the particular subject is addressed consistently through several documents, instances, or sessions of the content data, and the recurrence of the carries significant weight.

In another embodiment, a predetermined threshold may be applied where any dot product that has a value less than the threshold is ignored and only stronger dot products above the threshold are summed for the score. In another embodiment, this threshold may be empirically verified against a training data set to provide a more accurate subject analyses.

In another example, a number of subjects may be widely different, with some subjects having orders of magnitude less subject vectors than others. The weight scoring may significantly favor relatively unimportant subjects that occur frequently in the content data given the differences in the number of subject vectors. To address this problem, a linear scaling on the dot product scoring based on the number of subject vectors may be applied. The result provides a correction to the score so that important but less common subjects are weighed more heavily.

Once all scores are calculated for all subjects, then subjects may be sorted, and the most probable subjects are returned. The resulting output provides an array of subjects and strengths. In another embodiment, hashes may be used to store the subject vectors to provide a simple lookup of text data (e.g., words and phrases) and strengths. The one or more subject vectors can be represented by hashes of words and strengths, or alternatively an ordered byte stream (e.g., an ordered byte stream of 4-byte integers, etc.) with another array of strengths (e.g., 4-byte floating-point strengths, etc.).

The content aggregation and reduction service can also use term frequency-inverse document frequency ("tf-idf") software processing techniques to generating weighting data that weight words or particular subjects. The tf-idf is represented by a statistical value that increases proportionally to the number of times a word appears in the content data. This frequency is offset by the number of separate content data instances that contain the word, which adjusts for the fact that some words appear more frequently in general across multiple discussions or documents. The result is a weight in favor of words or terms more likely to be important within the content data, which in turn can be used to weigh some subjects more heavily in importance than others. To illustrate with a simplified example, the tf-idf might indicate that the term "employment" carries significant weight within content data. To the extent any of the subjects identified by an LDA analysis include the term "employment," that subject can be assigned more weight by the content aggregation and reduction service.

In addition to recognizing subjects, the content aggregation and reduction service can identify other aspects of the content data, such as identifying questions and content sources. To identify questions, or interrogatories, the content aggregation and reduction service can utilize rule-based software modeling as well as neural networking technologies that are trained to recognize interrogatories.

The content aggregation and reduction service analyzes the content data through, for example, semantic parsing to identify attributes of the content data. Attributes include, for instance, parts of speech, such as the presence of particular interrogative words, such as who, whom, where, which, how, or what. In another example, the content data is analyzed to identify the location in a sentence of interrogative words and the surrounding context. For instance, sentences that start with the words "what" or "where" are more likely to be questions than sentence having these words placed in the middle of the sentence (e.g., "I don't know what to do," as opposed to "What should I do?" or "Where is the word?" as opposed to "Locate where in the sentence the word appears."). In that case, the closer the interrogative word is to the beginning of a sentence, the more weight is given to the probability it is a question word when applying neural networking techniques.

The content aggregation and reduction service can also incorporate Part of Speech ("POS") tagging software code that assigns words a parts of speech depending upon the neighboring words, such as tagging words as a noun, pronoun, verb, adverb, adjective, conjunction, preposition, or other relevant parts of speech. The content aggregation and reduction service can utilize the POS tagged words to help identify questions and subjects according to pre-defined rules, such as recognizing that the word "what" followed by a verb is also more likely to be a question than the word "what" followed by a preposition or pronoun (e.g., "What is this?" versus "What he wants is an answer.").

POS tagging in conjunction with Named Entity Recognition ("NER") software processing techniques can also be used by the content aggregation and reduction service to identify various content sources within the content data. NER techniques are utilized to classify a given word into a category, such as a person, product, organization, or location. Using POS and NER techniques to process the content data allow the content aggregation and reduction service to identify particular words and text as a noun and as representing a person participating in the discussion (i.e., a content source).

The content aggregation and reduction service can also perform a sentiment analysis to determine sentiment from the content data. Sentiment can indicate a view or attitude toward a situation or an event. Further, identifying sentiment in data can be used to determine a feeling, emotion or an opinion. The sentiment analysis can apply rule-based software applications or neural networking software applications, such as convolutional neural networks (discussed below), a lexical co-occurrence network, and bigram word vectors to perform sentiment analysis to improve accuracy of the sentiment analysis.

Sentiment analysis can determine the polarity of content data according to a scale defined by the provider, such as classifying content data as being very positive, somewhat positive, neutral, somewhat negative or very negative. The sentiment analysis can also determine particular emotion associated with the content data, such as optimistic, excited, frustrated, or a range of other emotions. Prior to performing a sentiment analysis, the content data is subject to the reduction analysis that can include tokenization, lemmatization, and stemming.

Polarity type sentiment analysis can apply a rule-based software approach that relies on lexicons, or lists of positive and negative words and phrases that are assigned a sentiment score. For instance, words such as "growth," "great," or "achieve" are assigned a sentiment score of certain value while negative words and phrases such as "failed," "missed," or "under performed" are assigned a negative score. The scores for each word within the tokenized, reduced content data are aggregated to determine an overall sentiment score. To illustrate with a simplified example, the words "great" and "growth" might be assigned a positive score of five (+5) while the word "failed" is assigned a score of negative ten (−10). The sentence "Growth failed to make targeted projection" could then be scored as a negative five (−5) reflecting an overall negative sentiment polarity. Similarly, the sentence "This product was a great big failure" might also be scored as a negative five, thereby reflecting a negative sentiment.

The content aggregation and reduction service can also apply machine learning software to determine sentiment, including use of such techniques to determine both polarity and emotional sentiment. Machine learning techniques also start with a reduction analysis. Words are then transformed into numeric values using vectorization that is accomplished through a "bag-of-words" model, Word2Vec techniques, or other techniques known to those of skill in the art. Word2Vec, for example, can receive a text input (e.g., a text corpus from a large data source) and generate a data structure (e.g., a vector representation) of each input word as a set of words. The data structure may be referred to herein at a "model" or "Word2Vec model."

Each word in the set of words is associated with a plurality of attributes. The attributes can also be called features, vectors, components, and feature vectors. For example, the data structure may include features associated with each word in the set of words. Features can include, for example, gender, nationality, etc. that describe the words. Each of the features may be determined based on techniques for machine learning (e.g., supervised machine learning) trained based on association with sentiment.

Training the neural networks is particularly important for sentiment analysis to ensure parts of speech such as subjectivity, industry specific terms, context, idiomatic language, or negation are appropriately processed. For instance, the phrase "Our rates are lower than competitors" could be a favorable or unfavorable comparison depending on the particular context, which should be refined through neural network training.

Machine learning techniques for sentiment analysis can utilize classification neural networking techniques where a corpus of content data is, for example, classified according to polarity (e.g., positive, neural, or negative) or classified according to emotion (e.g., satisfied, contentious, etc.). Suitable neural networks can include, without limitation, Naive Bayes, Support Vector Machines using Logistic Regression, convolutional neural networks, a lexical co-occurrence network, bigram word vectors, Long Short-Term Memory.

Neural networks are trained using training set content data that comprise sample tokens, phrases, sentences, paragraphs, or documents for which desired subjects, content sources, interrogatories, or sentiment values are known. A labeling analysis is performed on the training set content data to annotate the data with known subject labels, interrogatory labels, content source labels, or sentiment labels, thereby generating annotated training set content data. For example, a person can utilize a labeling software application to review training set content data to identify and tag or "annotate" various parts of speech, subjects, interrogatories, content sources, and sentiments.

The training set content data is then fed to the content aggregation and reduction service neural networks to identify subjects, interrogatories, content sources, or sentiments and the corresponding probabilities. For example, the analysis might identify that particular text represents a question with a 35% probability. If the annotations indicate the text is, in fact, a question, an error rate can be taken to be 65% or the difference between the calculated probability and the known certainty. Then parameters to the neural network are adjusted (i.e., constants and formulas that implement the nodes and connections between node), to increase the probability from 35% to ensure the neural network produces more accurate results, thereby reducing the error rate. The process is run iteratively on different sets of training set content data to continue to increase the accuracy of the neural network.

Artificial Intelligence

A machine learning program may be configured to implement stored processing, such as decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor ("KNN"), and the like. Additionally or alternatively, the machine learning algorithm may include one or more regression algorithms configured to output a numerical value in response to a given input. Further, the machine learning may include one or more pattern recognition algorithms—e.g., a module, subroutine or the like capable of translating text or string characters and/or a speech recognition module or subroutine. The machine learning modules may include a machine learning acceleration logic (e.g., a fixed function matrix multiplication logic) that implements the stored processes or optimizes the machine learning logic training and interface.

The machine learning modules utilized by the present systems and methods can be implemented with neural networking techniques. Neural networks learn to perform tasks by processing examples, without being programmed with any task-specific rules. A neural network generally includes connected units, neurons, or nodes (e.g., connected by synapses) and may allow for the machine learning program to improve performance. A neural network may define a network of functions, which have a graphical relationship. As an example, a feedforward network may be utilized, such as an acyclic graph with nodes arranged in layers.

A feedforward network 260 (as depicted in FIG. 2A) may include a topography with a hidden layer 264 between an input layer 262 and an output layer 266. The input layer 262 includes input nodes 272 that communicate input data, variables, matrices, or the like to the hidden layer 264 that is implemented with hidden layer nodes 274. The hidden layer 264 generates a representation and/or transformation of the input data into a form that is suitable for generating output data. Adjacent layers of the topography are connected at the edges of the nodes of the respective layers, but nodes within a layer typically are not separated by an edge.

In at least one embodiment of such a feedforward network, data is communicated to the nodes 272 of the input layer, which then communicates the data to the hidden layer 264. The hidden layer 264 may be configured to determine the state of the nodes in the respective layers and assign weight coefficients or parameters of the nodes based on the edges separating each of the layers. That is, the hidden layer 264 implements activation functions between the input data communicated from the input layer 262 and the output data communicated to the nodes 276 of the output layer 266.

It should be appreciated that the form of the output from the neural network may generally depend on the type of model represented by the algorithm. Although the feedforward network 260 of FIG. 2A expressly includes a single hidden layer 264, other embodiments of feedforward networks within the scope of the descriptions can include any number of hidden layers. The hidden layers are intermediate the input and output layers and are generally where all or most of the computation is done.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem.

Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient (e.g., a propagated value). The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

An additional or alternative type of neural network suitable for use in the machine learning program and/or module is a Convolutional Neural Network ("CNN"). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program.

A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

An example convolutional neural network CNN is depicted and referenced as 280 in FIG. 2B. As in the basic feedforward network 260 of FIG. 2A, the illustrated example of FIG. 2B has an input layer 282 and an output layer 286. However where a single hidden layer 264 is represented in FIG. 2A, multiple consecutive hidden layers 284A, 284B, and 284C are represented in FIG. 2B. The edge neurons represented by white-filled arrows highlight that hidden layer nodes can be connected locally, such that not all nodes of succeeding layers are connected by neurons. FIG. 2C, representing a portion of the convolutional neural network 280 of FIG. 2B, specifically portions of the input layer 282 and the first hidden layer 284A, illustrates that connections can be weighted. In the illustrated example, labels W1 and W2 refer to respective assigned weights for the referenced connections. Two hidden nodes 283 and 285 share the same set of weights W1 and W2 when connecting to two local patches.

Figure 3:
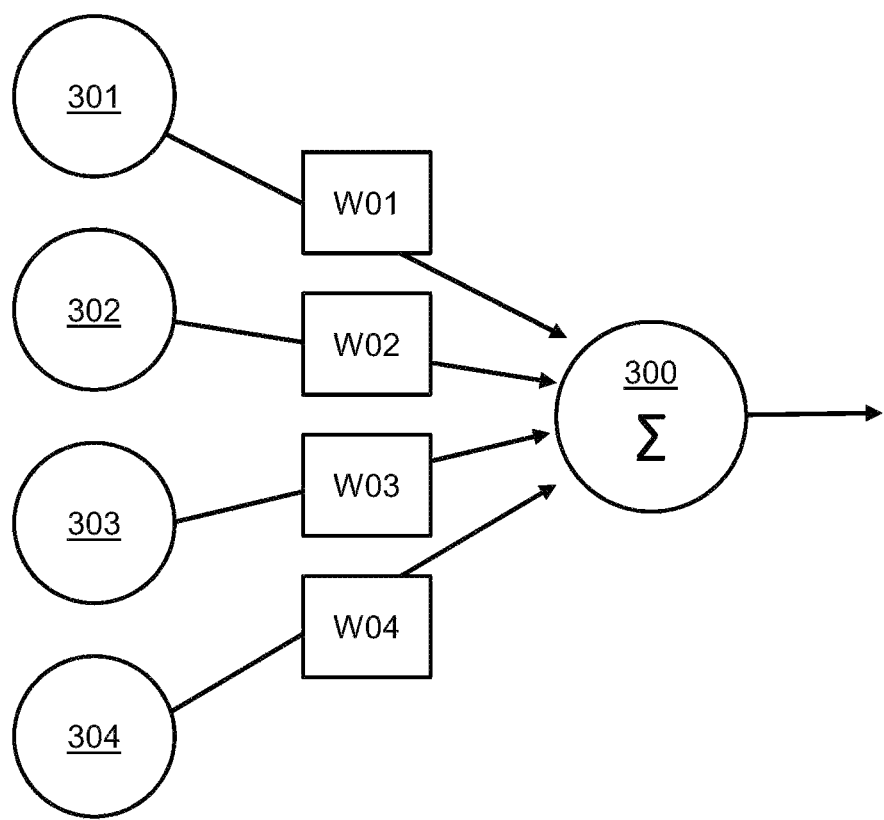
FIG. 3 is a diagram representing an example weighted sum computation in a node in an artificial neural network.

Weight defines the impact a node in any given layer has on computations by a connected node in the next layer. FIG. 3 represents a particular node 300 in a hidden layer. The node 300 is connected to several nodes in the previous layer representing inputs to the node 300. The input nodes 301, 302, 303 and 304 are each assigned a respective weight W01, W02, W03, and W04 in the computation at the node 300, which in this example is a weighted sum.

An additional or alternative type of feedforward neural network suitable for use in the machine learning program and/or module is a Recurrent Neural Network ("RNN"). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter. That is, at least a portion of the output data from the RNN may be used as feedback or input in calculating subsequent output data. In some embodiments, the machine learning module may include an RNN configured for language processing (e.g., an RNN configured to perform statistical language modeling to predict the next word in a string based on the previous words). The RNN(s) of the machine learning program may include a feedback system suitable to provide the connection(s) between subsequent and previous layers of the network.

Figure 4:
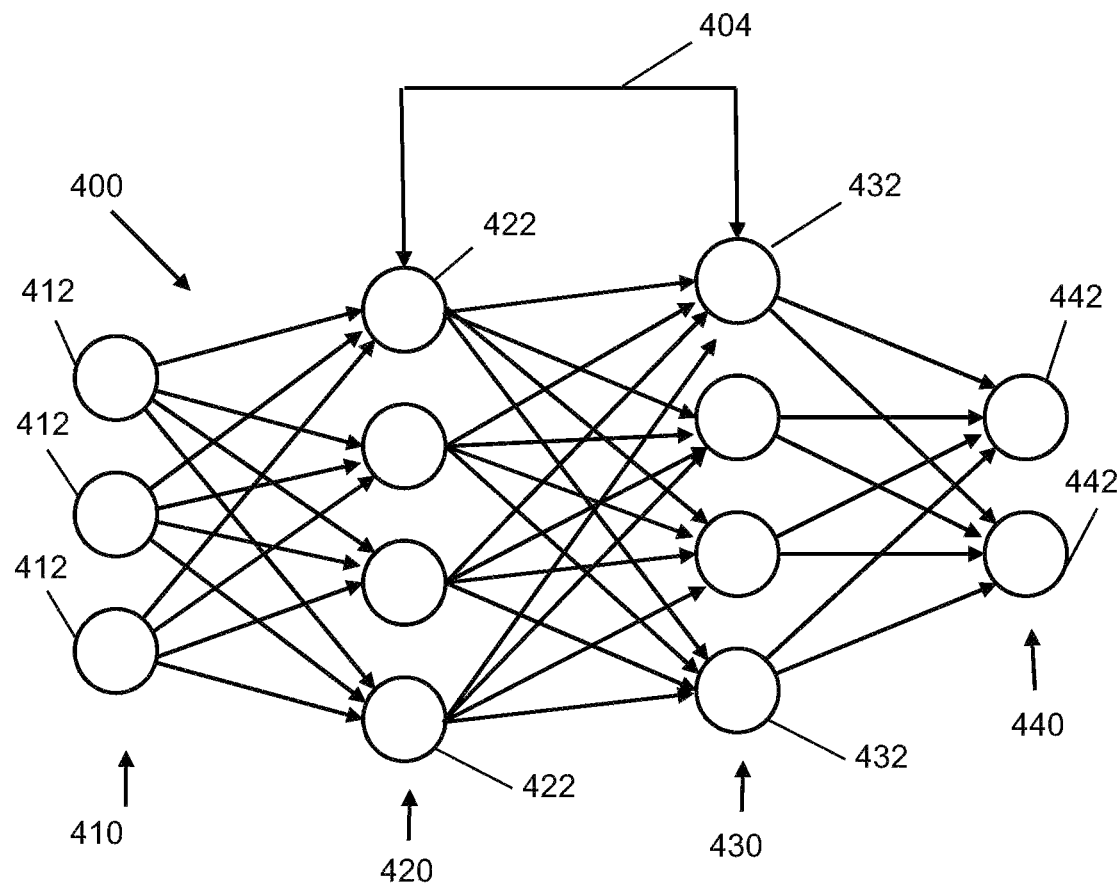
FIG. 4 is a diagram of a Recurrent Neural Network RNN, according to at least one embodiment, utilized in machine learning.

An example RNN is referenced as 400 in FIG. 4. As in the basic feedforward network 260 of FIG. 2A, the illustrated example of FIG. 4 has an input layer 410 (with nodes 412) and an output layer 440 (with nodes 442). However, where a single hidden layer 264 is represented in FIG. 2A, multiple consecutive hidden layers 420 and 430 are represented in FIG. 4 (with nodes 422 and nodes 432, respectively). As shown, the RNN 400 includes a feedback connector 404 configured to communicate parameter data from at least one node 432 from the second hidden layer 430 to at least one node 422 of the first hidden layer 420. It should be appreciated that two or more nodes of a subsequent layer may provide or communicate a parameter or other data to a previous layer of the RNN network 400. Moreover, in some embodiments, the RNN 400 may include multiple feedback connectors 404 (e.g., connectors 404 suitable to communicatively couple pairs of nodes and/or connector systems 404 configured to provide communication between three or more nodes). Additionally or alternatively, the feedback connector 404 may communicatively couple two or more nodes having at least one hidden layer between them (i.e., nodes of nonsequential layers of the RNN 400).

In an additional or alternative embodiment, the machine learning program may include one or more support vector machines. A support vector machine may be configured to determine a category to which input data belongs. For example, the machine learning program may be configured to define a margin using a combination of two or more of the input variables and/or data points as support vectors to maximize the determined margin. Such a margin may generally correspond to a distance between the closest vectors that are classified differently. The machine learning program may be configured to utilize a plurality of support vector machines to perform a single classification. For example, the machine learning program may determine the category to which input data belongs using a first support vector determined from first and second data points/variables, and the machine learning program may independently categorize the input data using a second support vector determined from third and fourth data points/variables. The support vector machine(s) may be trained similarly to the training of neural networks (e.g., by providing a known input vector, including values for the input variables) and a known output classification. The support vector machine is trained by selecting the support vectors and/or a portion of the input vectors that maximize the determined margin.

As depicted, and in some embodiments, the machine learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers).

Generally, the neural network(s) of the machine learning program may include a relatively large number of layers (e.g., three or more layers) and are referred to as deep neural networks. For example, the node of each hidden layer of a neural network may be associated with an activation function utilized by the machine learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

Figure 5:
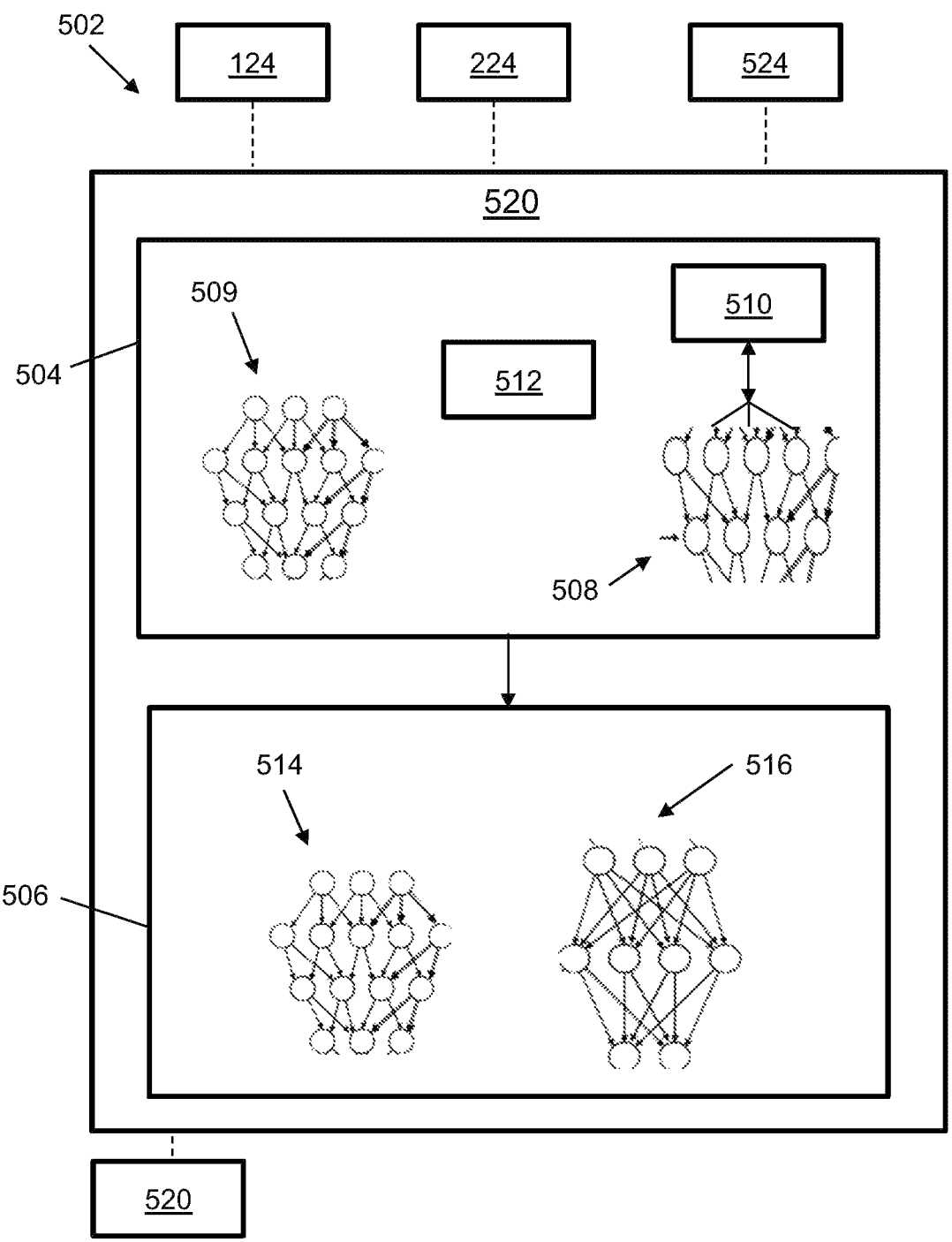
FIG. 5 is a schematic logic diagram of an artificial intelligence program including a front-end and a back-end algorithm.

Referring now to FIG. 5 and some embodiments, an artificial intelligence program 502 may include a front-end algorithm 504 and a back-end algorithm 506. The artificial intelligence program 502 may be implemented on an AI processor 520. The instructions associated with the front-end algorithm 504 and the back-end algorithm 506 may be stored in an associated memory device and/or storage device of the system (e.g., memory device 124 and/or memory device 224) communicatively coupled to the AI processor 520, as shown. Additionally or alternatively, the system may include one or more memory devices and/or storage devices (represented by memory 524 in FIG. 5) for processing use and/or including one or more instructions necessary for operation of the AI program 502. In some embodiments, the AI program 502 may include a deep neural network (e.g., a front-end network 504 configured to perform pre-processing, such as feature recognition, and a back-end network 506 configured to perform an operation on the data set communicated directly or indirectly to the back-end network 506). For instance, the front-end program 506 can include at least one CNN 508 communicatively coupled to send output data to the back-end network 506.

Additionally or alternatively, the front-end program 504 can include one or more AI algorithms 510, 512 (e.g., statistical models or machine learning programs such as decision tree learning, associate rule learning, recurrent artificial neural networks, support vector machines, and the like). In various embodiments, the front-end program 504 may be configured to include built in training and inference logic or suitable software to train the neural network prior to use (e.g., machine learning logic including, but not limited to, image recognition, mapping and localization, autonomous navigation, speech synthesis, document imaging, or language translation). For example, a CNN 508 and/or AI algorithm 510 may be used for image recognition, input categorization, and/or support vector training.

In some embodiments and within the front-end program 504, an output from an AI algorithm 510 may be communicated to a CNN 508 or 509, which processes the data before communicating an output from the CNN 508, 509 and/or the front-end program 504 to the back-end program 506. In various embodiments, the back-end network 506 may be configured to implement input and/or model classification, speech recognition, translation, and the like. For instance, the back-end network 506 may include one or more CNNs (e.g, CNN 514) or dense networks (e.g., dense networks 516), as described herein.

For instance and in some embodiments of the AI program 502, the program may be configured to perform unsupervised learning, in which the machine learning program performs the training process using unlabeled data (e.g., without known output data with which to compare). During such unsupervised learning, the neural network may be configured to generate groupings of the input data and/or determine how individual input data points are related to the complete input data set (e.g., via the front-end program 504). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 502 may be trained using a semi-supervised learning process in which some but not all of the output data is known (e.g., a mix of labeled and unlabeled data having the same distribution).

In some embodiments, the AI program 502 may be accelerated via a machine learning framework 520 (e.g., hardware). The machine learning framework may include an index of basic operations, subroutines, and the like (primitives) typically implemented by AI and/or machine learning algorithms. Thus, the AI program 502 may be configured to utilize the primitives of the framework 520 to perform some or all of the calculations required by the AI program 502. Primitives suitable for inclusion in the machine learning framework 520 include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine learning program may include variations, adaptations, and alternatives suitable to perform the operations necessary for the system, and the present disclosure is equally applicable to such suitably configured machine learning and/or artificial intelligence programs, modules, etc. For instance, the machine learning program may include one or more long short-term memory ("LSTM") RNNs, convolutional deep belief networks, deep belief networks DBNs, and the like. DBNs, for instance, may be utilized to pre-train the weighted characteristics and/or parameters using an unsupervised learning process. Further, the machine learning module may include one or more other machine learning tools (e.g., Logistic Regression ("LR"), Naive-Bayes, Random Forest ("RF"), matrix factorization, and support vector machines) in addition to, or as an alternative to, one or more neural networks, as described herein.

Those of skill in the art will also appreciate that other types of neural networks may be used to implement the systems and methods disclosed herein, including, without limitation, radial basis networks, deep feed forward networks, gated recurrent unit networks, auto encoder networks, variational auto encoder networks, Markov chain networks, Hopefield Networks, Boltzman machine networks, deep belief networks, deep convolutional networks, deconvolutional networks, deep convolutional inverse graphics networks, generative adversarial networks, liquid state machines, extreme learning machines, echo state networks, deep residual networks, Kohonen networks, and neural turning machine networks, as well as other types of neural networks known to those of skill in the art.

Figure 6:
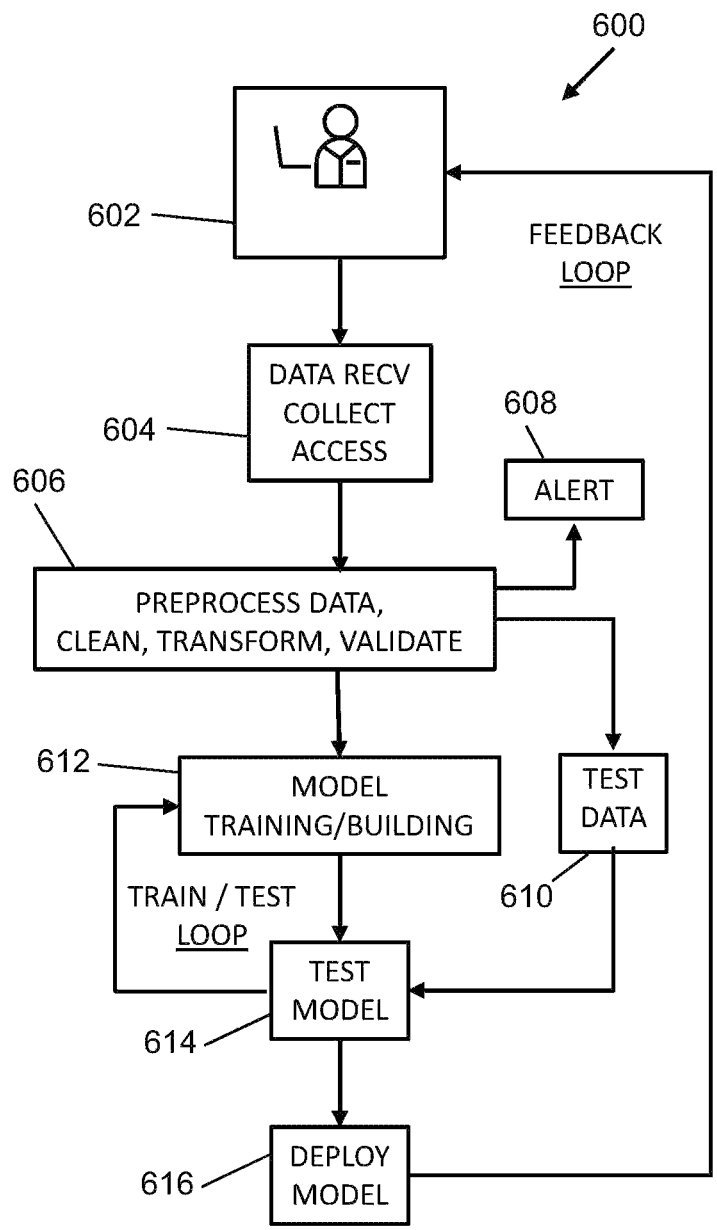
FIG. 6 is a flow chart representing a method model development and deployment by machine learning.

FIG. 6 is a flow chart representing a method 600, according to at least one embodiment, of model development and deployment by machine learning. The method 600 represents at least one example of a machine learning workflow in which steps are implemented in a machine learning project.

In step 602, a user authorizes, requests, manages, or initiates the machine-learning workflow. This may represent a user such as human agent, or customer, requesting machine-learning assistance or AI functionality to simulate intelligent behavior (such as a virtual agent) or other machine-assisted or computerized tasks that may, for example, entail visual perception, speech recognition, decision-making, translation, forecasting, predictive modelling, and/or suggestions as non-limiting examples. In a first iteration from the user perspective, step 602 can represent a starting point. However, with regard to continuing or improving an ongoing machine learning workflow, step 602 can represent an opportunity for further user input or oversight via a feedback loop.

In step 604, user evaluation data is received, collected, accessed, or otherwise acquired and entered as can be termed data ingestion. In step 606 the data ingested in step 604 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing step 606 is updated with newly ingested data, an updated model will be generated.

Step 606 can include data validation, which focuses on confirming that the statistics of the ingested data are as expected, such as that data values are within expected numerical ranges, that data sets are within any expected or required categories, and that data comply with any needed distributions such as within those categories. Step 606 can proceed to step 608 to automatically alert the initiating user, other human or virtual agents, and/or other systems, if any anomalies are detected in the data, thereby pausing or terminating the process flow until corrective action is taken.

In step 610, training test data such as a target variable value is inserted into an iterative training and testing loop. In step 612, model training, a core step of the machine learning work flow, is implemented. A model architecture is trained in the iterative training and testing loop. For example, features in the training test data are used to train the model based on weights and iterative calculations in which the target variable may be incorrectly predicted in an early iteration as determined by comparison in step 614, where the model is tested. Subsequent iterations of the model training, in step 612, may be conducted with updated weights in the calculations.

When compliance and/or success in the model testing in step 614 is achieved, process flow proceeds to step 616, where model deployment is triggered. The model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

Content Data Processing, Filtering, and Segmenting

Figure 7:
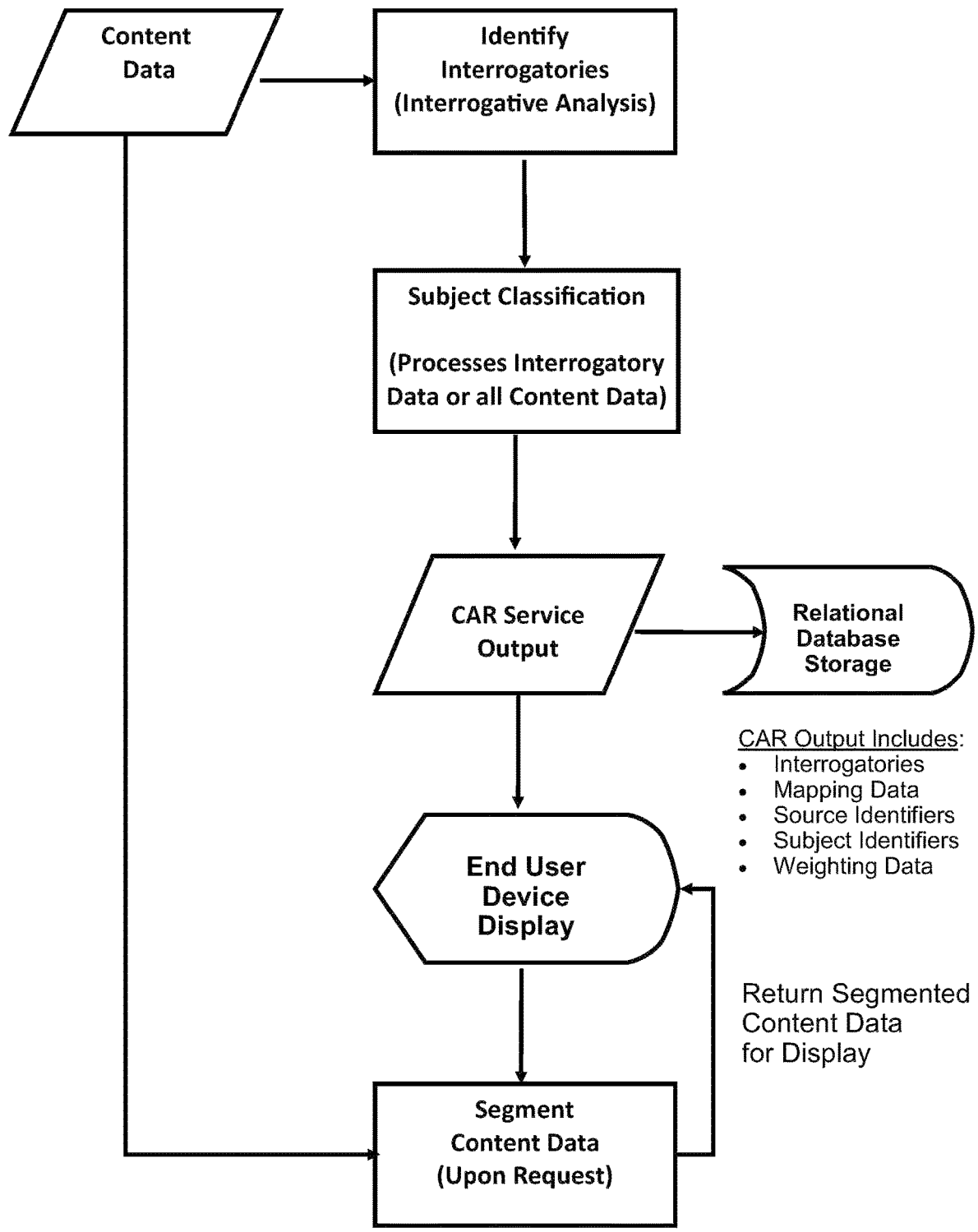
FIG. 7 is a flow chart representing a method for content analysis according to one embodiment.

One example process for analyzing content data using the content aggregation and reduction service is shown in FIG. 7. The content aggregation and reduction ("CAR") service begins by ingesting content data, which can represent a single document, file, or transcript of a single written or verbal interaction (i.e., a single "session"). Alternatively, the content data can represent a multitude of sessions, such as processing multiple separate content data files that each represent a transcript of a separate written or verbal interaction occurring on different days with different content sources. Where the content data includes multiple sessions, end users are provided with a Session Selection input function that allows selection of one or a multitude of sessions for processing. The example check box session selection input functions 802 & 902 shown in FIGS. 8 and 9 illustrate multiple sessions of content data being selected for processing through selection of the input function corresponding to "aggregated content session."

After content data ingestion, the content aggregation and reduction service conducts an interrogative analysis to generate interrogative data, which includes data representing one or more questions or interrogatories posed within the underlying content data. The interrogatories posed are taken as being significant indicators of interesting for particular subjects addressed within the content data. The interrogative analysis also generates source identifier data for each interrogatory. Source identifier data can include, for example, the name, job title, or affiliate business enterprise (i.e., an employer) of a conversation participant that posed an interrogatory. The example Content Explorer graphical user interface ("GUI") shown in FIG. 8 illustrates display of a source identifier of "Patrick H." having a job title of "Analyst" with an affiliate entity of "Patent Co."

The interrogative analysis also generates interrogative content mapping data that maps each interrogatory to a location within the content data. The interrogative content mapping data can be a pointer to a memory location. In other embodiments, the interrogative content mapping data can include one or a combination of a file name, file path, timestamp data, document page or line numbers, or other information that points to a particular location within the content data that includes the interrogatory In this manner, each interrogatory can be expediently accessed by end users within the overall corpus of the content data.

Figure 8:
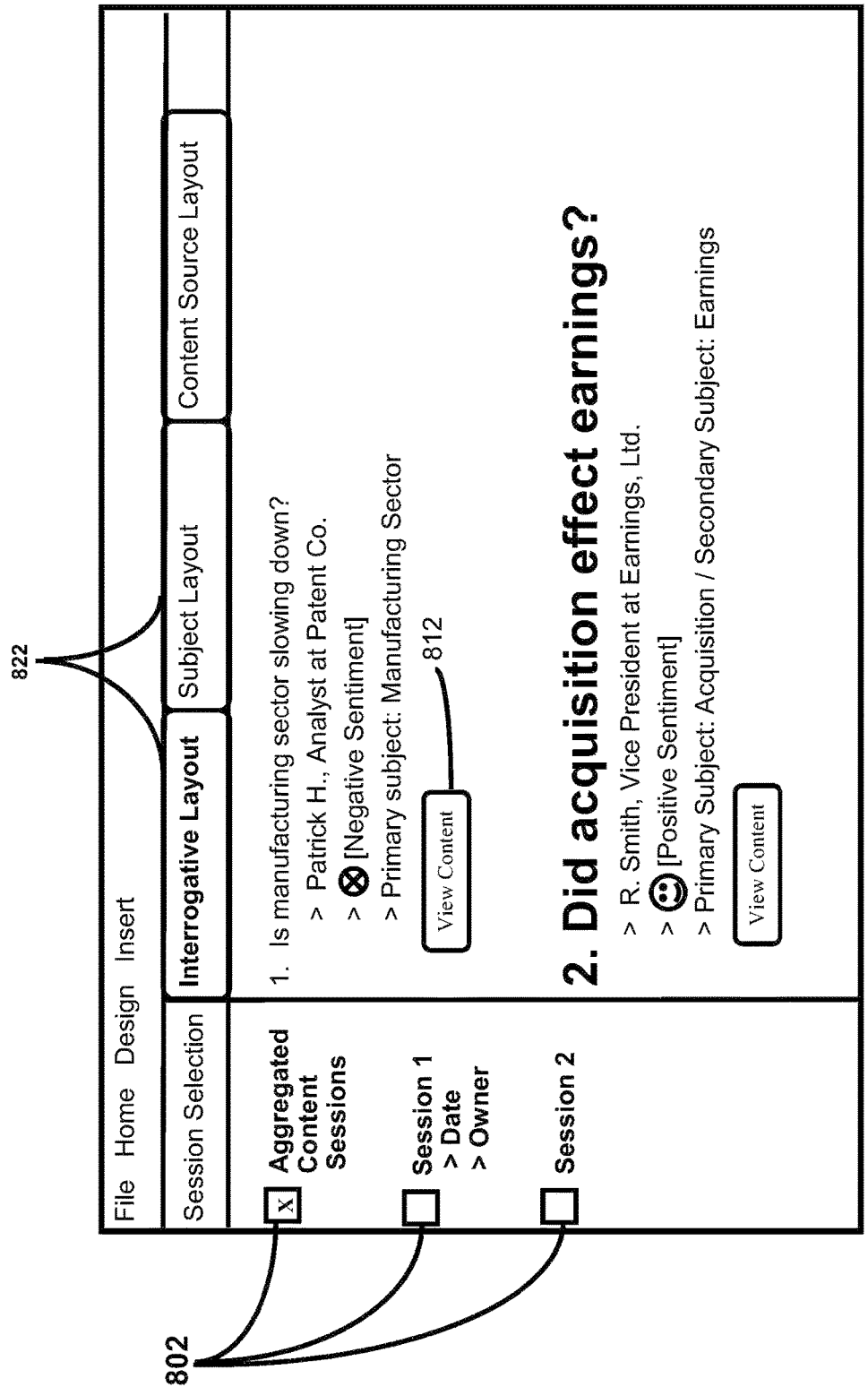
FIG. 8 is an example Content Explorer graphical user interface according to one embodiment.
Figure 9:
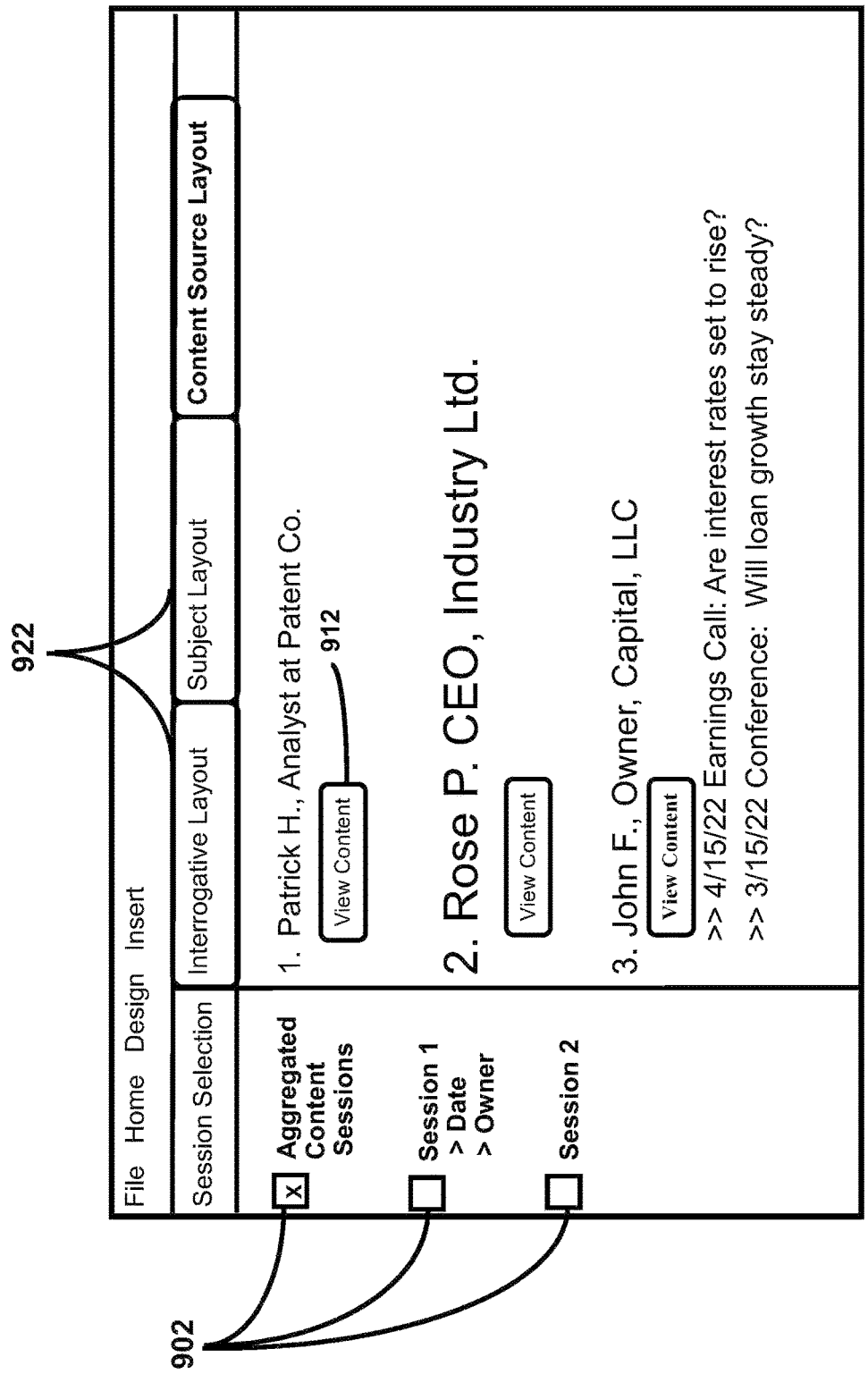
FIG. 9 is an example Content Explorer graphical user interface according to one embodiment.

To illustrate access to interrogatories, end users are presented with a Content Explorer GUI, such as the example user interface shown in FIG. 8. The Content Explorer GUI displays a list of identified interrogatories. End users can select an icon, button, text, or other input function 812 called a View Content function 812 shown on the GUI that represents a particular interrogatory. Selection of the View Content input function 812 in turn causes the graphical user interface to display segmented content data that includes the selected interrogatory as well as content data surrounding the interrogatory (e.g., a certain number of words or pages prior to and following the interrogatory). Thus, the interrogative analysis effectively segments and parses the content data and allows end users to expediently filter the content data for display such that end users can display only segments of content data representing selected interrogatories.

Significantly, because each interrogatory is also associated with source identifier data, the interrogative content mapping data also maps to various content sources within the content data. A list of content sources can be presented to an end user on a Content Explorer GUI based on the source identifier data, such as the example Content Explorer GUI shown in FIG. 9. The Content Explorer GUI can include a link, button, or other input function (the View Content input function 912) that causes the user interface to display segmented content data that includes content generated by the particular content source as well as surrounding content data. An example of segmented content data display is shown in FIG. 9 where selection of the View Content input function under the source identifier "John F." displays two interrogatories included in the underlying content data associated with the source identifier. The underlying content data can also be displayed with information relating to the underlying content data, such as the date the content data was generated. Again, in this manner, the system segments portions of the content data according to content source and allows end users to filter the content data by displaying only those segments of the content data that include contend data generated by a selected content source.

The content and aggregation service optionally performs a sentiment analysis to determine the polarity or emotional descriptor of sentiment for the one or more interrogatories. The example Content Explorer GUI of FIG. 8 illustrates display of a sentiment indicator proximal to the interrogatories showing whether the sentiment is positive or negative. Alternative embodiments can instead display a qualitative description of sentiment, such as "optimistic," "frustrated," "contentious," or other applicable sentiment descriptors.

The content and aggregation service further performs a subject classification analysis using either the content data as a whole or by processing just the content data comprising the individual interrogatories. In some cases, system end users may be particularly interested in the subjects raised by the various interrogatories within the content data. Such a case is illustrated in FIG. 7 where the process begins with the interrogative analysis and the subject classification analysis is performed using the content data comprising the interrogatories. Analysis of the interrogatory subjects provides analytical insights not just into the overall topics addressed and purpose of the interaction but also insights into the subjects that are of most interest to the content sources as participants in an interactive exchange.

The subject classification analysis generates subject identifier data that includes a list of subjects identified within the analyzed content data. The subject classification analysis also generates subject content mapping data that correlates a particular subject to a location within the underlying content data using memory pointers, file names, file paths, timestamp data, document page or line numbers, or other information. Thus, the underlying content data associated with a subject can be expediently accessed by end users by selection of an icon, button, text, or other function on a graphical user interface.

The subject classification analysis further generates subject weighting data for each subject identified within the content data. The subject weighting data can be represented by a numeric score that provides a measure of relative significance of each subject by analyzing the frequency that the subject appears within the content data using, for example, tf-idf techniques.

The weighting data can be presented to end users through a variety of techniques. For example, end users can be presented with a Content Explorer GUI that lists the subjects identified within the content data. A numeric score representing the subject weighting data can be displayed proximal to each subject. Alternatively, the subject weighting data can be used to express a qualitative measure of importance, such as identifying subjects as "primary" or "secondary" depending on whether the subject weighting data corresponds to a numeric score above or below a predetermined threshold. The qualitative measure is then displayed proximal to the subject within the Content Explorer GUI. In another example, subjects having a higher weight can be displayed with larger sized font or fonts of a different color than subjects carrying a lower weight. Or the subjects can be displayed as an ordered list with subject having a higher weight appearing higher on the list.

The subject classification analysis can also generate an interrogative subject identifier for each interrogatory identified within the content data. Once the subject identifier data is generated, representing a list of subjects, neural networking techniques are used to associate one or more subject identifiers with each interrogatory by determining probabilities that particular interrogatories relate to a given subject. The subject-interrogatory pairs with the highest probability are taken as a match.

A provider can also set predetermined probability thresholds to ensure that only probabilities above the threshold are taken as a match. In some embodiments, each interrogatory is related to a single subject identifier. Alternatively, each interrogatory can be matched with multiple subject identifiers, such as a primary subject identifier and a secondary subject identifier where, for instance, an interrogatory relates to multiple subjects. As an example, an interrogatory of "How will rising interest rates effect employment?" could be associated with two subject identifiers, such as "interest rates" and "job growth." The second example interrogatory shown in FIG. 8 of "Did acquisition effect earnings?" is also associated with two subject identifiers, including a primary subject identifier of "Acquisition" and a secondary subject identifier of "Earnings."

The feature of matching interrogatories to one or more subject identifiers permits end users to better compare subjects that are addressed through various interrogatories generated by various content sources notwithstanding potential syntax or semantic variations between interrogatories. In other words, even if two questions are phrased differently, the system could identify the questions are relating to the same subjects. The feature also permits displaying interrogatories according to the relative weights of the underlying subject identifiers. For instance, the second interrogatory in FIG. 8 is shown in larger font than the first interrogatory, thereby indicating that the primary subject identifier of "Acquisition" carriers more significant subject weighing data than the primary subject identifier of "Manufacturing Section" for the first interrogatory.

In some embodiments, the content aggregation and reduction service can also determine source weighting data as part of the interrogative or subject classification analyses. The source weighting data can be a numeric score reflecting the relative significance of each source and can be determined using one or a combination of techniques. As an example, source weighting data can be determined from the frequency or number of times that a content source appears within the content data. The Content Explorer GUI of FIG. 9 illustrates display of source weighting data where the source identifiers "Patrick H.," "Sally J." and "John F." are displayed in different size fonts with the larger fonts indicating more significant source weighting data.

The source weighting data can also utilize the subject weighting data. That is, each content source will be associated with one or more interrogatories, that are in turn associated with one or more subject identifiers, that are in turn associated with subject weighting data. In short, a content source can be identified as having generated questions on significant subjects, as determined from the subject weighting data. In that case, source weighting data can be calculated from a combination of both the frequency that the content source appears in the content data as well as the associated subject weighting data where each of these factors carries a predetermined mathematical weight in the source weighing determination. To illustrate, a provider might determine that a content source that frequently poses "canned" or less significant questions should carry less weight than a content source that generates fewer questions but of substantially greater significance. In that case, the frequency will carry less weight in the analysis than the subject weighting data.

The results of the interrogative and subject classification analyses are stored to a relational database in a manner that associates the various types of data. The information stored to the database includes, without limitation: (i) alphanumeric content data that represents one or more interrogatories; (ii) the interrogative content mapping data; (iii) the source identifiers; (iv) the source weighting data; (v) subject identifier data; (vi) subject content mapping data, (vii) subject weighting data; and (viii) the an interrogative subject identifiers. Storing the information to the relational database ensures that appropriate relationships are maintained, such as associating an interrogatory with the content source identifier for the content source that created the interrogatory and the corresponding source weighting data for that content source as well as the interrogative content mapping providing a link to the content data that includes the interrogatory.

Those of ordinary skill in the art will appreciate that the example process shown in FIG. 7 is not intended to be limiting, and other processes or sequences of steps can be utilized to achieve the results and utilize the disclosed systems and methods. As one example, rather than first identifying interrogatories using the interrogative analysis, the system and first perform a subject classification analysis to identify subjects within the overall corpus of the content data before then conducting an interrogative analysis to identify one or more interrogatories. In yet another embodiments, the system can forgo determining the source weighting data, the subject weighing data, or the interrogative subject identifiers correlating interrogatories to subject matter identifiers.

Content Explorer Graphical User Interface

In some embodiments, end user computing devices access the content and other types of data through a communication link to the provider system. For example, the end user computing device may use an Internet browser software application or another integrated software application, such as an explorer interface service, to communicate with a provider server. The explorer interface service processes instructions and data that are sent to, and received by, the provider system for generating graphical user interfaces, such as the Content Explorer GUIs.

In some embodiments, the entire contents of the relational database are transmitted to the end user computing device and saved to transitory memory or long-term, non-transitory storage for expedient retrieval and display to the end user through a Content Explorer GUI. In other embodiments, only the data displayed on the Content Explorer GUI is transmitted to the end user computing device upon request by the end user computing device. For instance, the content aggregation and reduction service can transmit the source weighting data, but not the subject weighting data, when the subject identifiers are selected for display, such as the Content Explorer GUI depicted in FIG. 9.

The Content Explorer GUI includes one or more user input functions (i.e., buttons, pull-down menus, hyperlinks, etc.) that cause the explorer interface service to transmit commands, requests, and other data to the provider system. The input functions are utilized by the end user computing device to display and filter the content data and other types of data stored to the relational database on the provider system or to the end user computing device, thereby enabling the systems and methods disclosed herein to provide access to the filtered, enhanced content data.

Figure 10:
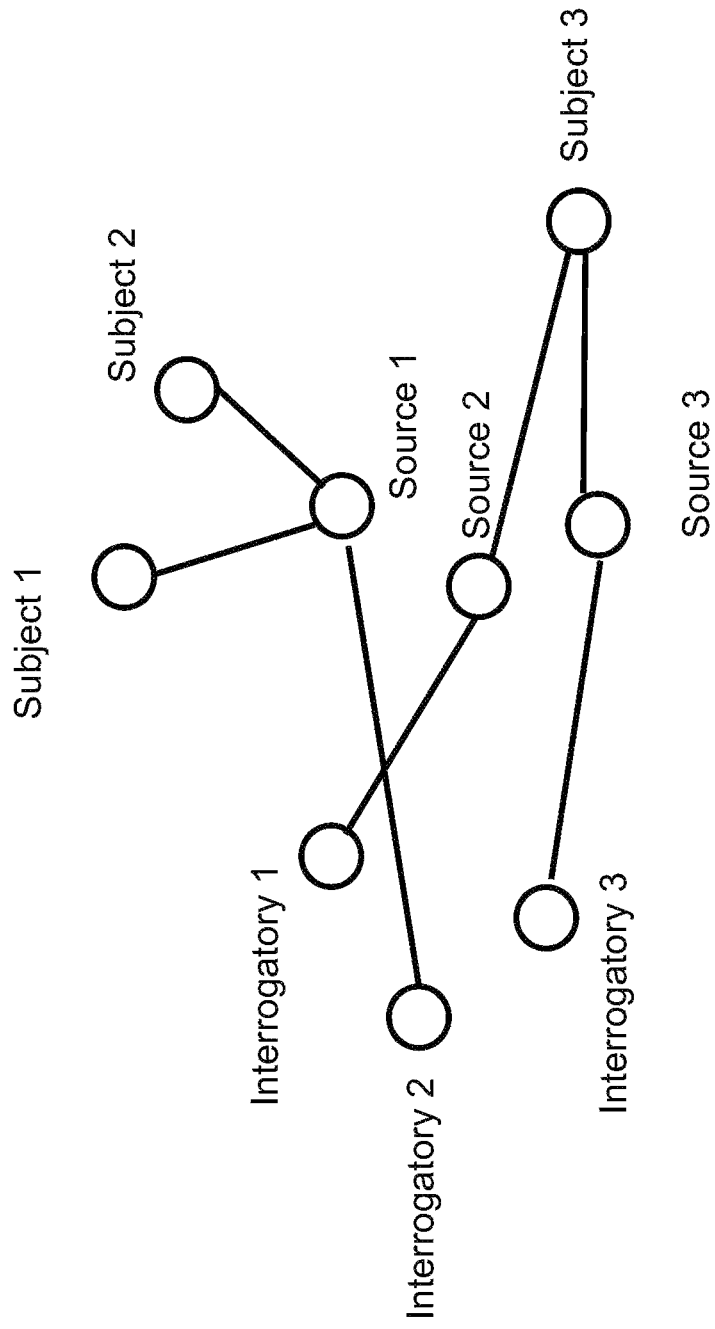
FIG. 10 is an example Content Explorer graphical user interface according to one embodiment.

In some embodiments, the Content Explorer GUIs can be configured to simultaneously display interrogatories, subject identifiers, and source identifiers using a network-type configuration such as the example configuration shown in FIG. 10. In that case, icons, shapes, or other graphical elements can be used to represent the various interrogatories, subject identifiers, and source identifiers. Lines are drawn between the graphical elements to represent connections between, for example, an interrogatory and the source identifier for the content source that generated the interrogatory. Additional lines can be drawn between the interrogatories and the subject identifiers that represent the subjects associated with each interrogatory. For some embodiments, the graphical elements representing the interrogatories, subject identifiers, and source identifiers can be displayed in different sizes to indicate the relative weighting data.

In other embodiments, separate user interfaces are used to represent interrogatories, source identifiers, and subject identifiers. For such embodiments, navigation of a Content Explorer GUI can be illustrated with the following examples. An end user may select one or more options provided through a Layout Selection input function 822 & 922 to switch between: (i) a Subject Layout that displays one or more subject identifiers, (ii) a Source Layout that displays one or more source identifiers (e.g., the GUI shown in FIG. 9), or (iii) a Interrogative Layout that displays one or more interrogatories (e.g., the GUI shown in FIG. 8). The Layout Selection function can be implemented as a single user input function that presents a menu whereby end users can select between the different layouts. Or alternatively, the Layout Selection input function can be implemented with "tabs" or separate buttons that show simultaneous options allowing the end users to toggle between different layouts by selecting a corresponding tab, such as an Interrogative tab, Source tab, or a Subject tab (822 & 922) shown in FIGS. 8 & 9. Selecting the Layout Selection input function transmits a layout selection command to the provider system to request content explorer display data required for display on the Content Explorer GUI.

Each layout further displays correlated data as part of the content explorer data—i.e., the correlated or associated data stored to the relational database. For instance, the Subject Layout also displays the subject weighting data by (i) displaying a numeric weighting data value or score, (ii) displaying the subject identifiers as an ordered list, (iii)

displaying the subject identifiers with different colors, (iv) displaying the subject identifiers with relative sized fonts corresponding to the weighting data, or (v) other means known to one of skill in the art. The Subject Layout can also be configured to display one or more interrogatories associated with a subject identifier as well as the source identifier associated with each of the one or more interrogatories. In another example, the Interrogative Layout can display an ordered list of the one or more interrogatories where each interrogatory is displayed proximal to both a source identifier for the content source that generated the interrogatory and one or more subject identifiers that represent the subjects addressed by the interrogatory.

In embodiments where the entire relational database is not stored to the end user computing device, upon selection of the Layout Selection input function, the explorer interface service transmits a layout selection command to the provider system requesting only the content explorer display data required for display on a particular Content Explorer GUI. The layout selection command comprises a layout display selection data that can be set to (i) an interrogative layout selection when the one or more interrogatories are to be displayed (i.e., the Interrogative Layout of FIG. 8), (ii) a source layout selection when the source identifiers are selected for display (i.e., the Content Source Layout of FIG. 9), or (iii) a subject layout selection when the subject identifiers are selected for display (i.e., the Subject Layout). The provider system responds by transmitting data required for display on the selected layout.

To illustrate generating the example Content Explorer GUI shown in FIG. 9 where the Content Source Layout is selected, the explorer interface service running on the end user computing device receives data from the provider server that includes, without limitation: (i) source identifier data where each source is associated with one or more interrogatories; (ii) alphanumeric content data that represents the one or more interrogatories; (iii) interrogative content mapping data; (iv) source weighting data; and (v) display data utilized by the explorer service to render the Content Explore GUIs.

Display data received by an end user computing device includes instructions compatible with, and readable by, the particular Internet browser or software application for rendering a user interface, including graphical elements (e.g., icons, frames, etc.), digital images, text, numbers, colors, fonts, or layout data representing the orientation and arrangement graphical elements and alphanumeric data on a user interface screen.

The layouts can additionally include a View Content input function 812 & 912 that display underlying content data using the interrogative content mapping data and the subject content mapping data. The View Content input function can be implemented as separate Subject View, Source View, or Interrogatory View input functions on each of the respective layouts. Selecting the View Content input function can display the underlying content data by opening a new "tab" or new "window," or the content data can be displayed within the same layout proximal to the interrogatory, source identifier, or subject identifier.

The View Content input functions can be rendered on the Explorer GUIs as a hyperlink or a separate button or icon. Continuing with the foregoing examples, the Interrogative Layout can render the one or more interrogatories as a hyperlink that, when selected, causes the Explorer GUI to display the underlying content data that includes the interrogatory with the surrounding content data that precedes and follows the interrogatory. Thus, the interrogatory itself, as shown in the Explorer GUI, operates as an input function. In other embodiments, the View Content input function is implemented as a separate icon or button displayed proximal to the interrogatory.

The entire corpus of the content data can be transmitted to the end user computing device and saved to transitory memory or non-transitory storage. Selecting the View Content input function accesses the content data and retrieves the portion of the content data required for display through use of the interrogative content mapping data or the subject content mapping data. In other embodiments, the entire corpus of the content data remains stored to the provider system (or a third party system), and not the end user computing device. In that case, selecting the View Content input function causes the explorer interface service to transmit a segmented content command to the provider system that includes segmented content selection data.

The segmented content data selection can be set to an interrogative segment selection, a source segment selection, or a subject segment selection. The segmented content command can further include interrogative content mapping data or subject content mapping data used to retrieve segments of the underlying content data that include the interrogatory, subject identifier, or source identifier requested for display. The content aggregation and reduction service processes the segmented content command and returns segmented interrogative data (i.e., interrogatories from the underlying content data as well as surrounding content), segmented source data (i.e., interrogatories generated by the corresponding content source and surrounding content), or segmented subject data (i.e., underlying content data relating to the particular subject identifier as well as surrounding content).

The provider system processes the segmented content command to retrieve the requested segment of content data, such as a particular interrogatory, as well as content data preceding and following the interrogatory (e.g., a certain number of words or pages prior to and following the interrogatory). The segmented content data is then transmitted to the end user computing device and processed by the explorer interface service for display.

Although the foregoing description provides embodiments of the invention by way of example, it is envisioned that other embodiments may perform similar functions and/or achieve similar results. Any and all such equivalent embodiments and examples are within the scope of the present invention.

What is claimed is:

1. A system for training at least one neural network for dynamic filtering and display of content data, the system comprising a provider computing device that comprises one or more integrated software applications that perform the operations comprising:
   (a) receiving content data by a content aggregation and reduction service, wherein
      (i) the content aggregation and reduction service comprises one or more neural networks that each have at least one hidden layer,
      (ii) the at least one hidden layer comprises a plurality of nodes with each node comprising at least one weighting coefficient, and wherein
      (iii) the content aggregation and reduction service performs operations comprising
         (A) processing the content data by performing an interrogative analysis that generates a first interrogative data set comprising one or more interrogatories, and source identifier data for each of the interrogatories, and
(B) processing the interrogative data by performing a subject classification analysis that generates a first subject classification data set comprising subject identifier data;
(b) performing a labelling analysis on the received content data to generate (i) annotated interrogative data comprising one or more known interrogatories, and a known source identifier for each of the known interrogatories, and (ii) annotated subject classification data comprising known subject identifier data;
(c) generating interrogative error data and subject classification error data, by performing operations comprising
(i) applying the first interrogative data set against the annotated interrogative data to generate the interrogative error data, and
(ii) applying the first subject classification data set against the annotated subject classification data to generate the subject classification error data;
(d) refining the one or more neural networks by performing operations comprising
(i) feeding the interrogative error data and the subject classification error data through the one or more neural networks, and
(ii) adjusting the weighting coefficients to minimize the interrogative error data and the subject classification error data.

2. The system of claim 1, wherein the content data comprises a plurality of content sessions.

3. The system of claim 1, wherein:
(a) the content aggregation and reduction service comprises a first neural network that performs the interrogative analysis;
(b) the content aggregation and reduction service comprises a second neural network that performs the subject classification analysis; and
(c) the step of refining the one or more neural networks further comprises the operations of
(i) feeding the interrogative error data through the first neural network as a first error signal, and
(ii) feeding the subject classification error data through the second neural network as a second error signal.

4. The system of claim 1, wherein the at least one neural network comprises a convolutional neural network.

5. The system of claim 4, wherein the convolutional neural network (a) comprises at least three hidden layers, and (b) performs operations that implement a Latent Dirichlet Allocation model.

6. The system of claim 1, wherein the at least one neural network comprises a recurrent neural network.

7. The system of claim 6, wherein the at least one recurrent neural network comprises a long short-term memory neural network architecture.

8. The system of claim 1, wherein the one or more integrated software applications perform the further operations comprising:
(a) processing the interrogative data by performing a sentiment analysis to generate a first sentiment data set;
(b) performing a labelling analysis on the received content data to generate annotated sentiment data;
(c) generating sentiment error data by applying the first sentiment data set against the annotated sentiment data; and wherein (d) the step of refining the one or more neural networks further comprises the operations of (i) feeding the sentiment error data through the one or more neural networks, and (ii) adjusting the weighting coefficients to minimize the sentiment error data.

9. The system of claim 1, wherein the one or more integrated software applications perform the further operations comprising:
(a) processing the interrogative data to generate an interrogative subject identifier for each of the interrogatories;
(b) performing a labelling analysis on the received content data to generate annotated subject identifier data for each of the interrogatories;
(c) generating subject identifier error data by applying the subject identifier for each of the interrogatories against the annotated subject identifier data for each of the interrogatories; and wherein
(d) the step of refining the one or more neural networks further comprises the operations of (i) feeding the subject identifier error data through the one or more neural networks, and (ii) adjusting the weighting coefficients to minimize the subject identifier error data.

10. The system of claim 1, wherein the one or more integrated software applications perform the further operations comprising:
(a) processing the interrogative data to generate (i) source weighting data for each source identifier, and (ii) subject weighting data for each subject identifier;
(b) performing a labelling analysis on the received content data to generate (i) annotated source weighting data for each source identifier, and (ii) annotated subject weighting data for each subject identifier;
(c) generating source weighting error data by applying the source weighting data for each of source identifier against the annotated source weighting data for each source identifier;
(d) generating subject weighting error data by applying the subject weighting data for each subject identifier against the annotated subject weighting data for each subject identifier; and wherein
(e) the step of refining the one or more neural networks further comprises the operations of (i) feeding the subject weighting error data and the subject weighting error data through the one or more neural networks, and (ii) adjusting the weighting coefficients to minimize the subject identifier error data.

11. A system for training at least one neural network for dynamic filtering and display of content data, the system comprising a provider computing device that comprises one or more integrated software applications that perform the operations comprising:
(a) collecting content data by a Content Application Programming Interface (API), wherein the Content API collects the content data by interfacing with a remote database, and wherein the content data comprises audio data generated by a plurality of content data sources;
(b) processing the content data utilizing an audio-to-text software services that generates transcribed content data;
(c) receiving the transcribed content data by a content aggregation and reduction service, wherein
(i) the content aggregation and reduction service comprises one or more neural networks that each have at least one hidden layer, (ii) the at least one hidden layer comprises a plurality of nodes with each node comprising at least one weighting coefficient, and wherein (iii) the content aggregation and reduction service performs operations comprising (A) processing the transcribed content data by performing an interrogative analysis that generates a first interrogative data set comprising one or more interrogatories, and source identifier data for each of the interrogatories, and (B) processing the interrogative data by performing a subject classification analysis that generates a first subject classification data set comprising subject identifier data;

(d) performing a labelling analysis on the received transcribed content data to generate (i) annotated interrogative data comprising one or more known interrogatories, and a known source identifier data for each of the known interrogatories, and (ii) annotated subject classification data comprising known subject identifier data;

(e) generating an interrogative error data and subject classification error data, by performing operations comprising (i) applying the first interrogative data set against the annotated interrogative data to generate the interrogative error data, and (ii) applying the first subject classification data set against the annotated subject classification data to generate the subject classification error data;

(f) refining the one or more neural networks by performing operations comprising (i) feeding the interrogative error data and the subject classification error data through the one or more neural networks, and (ii) adjusting the weighting coefficients to minimize the interrogative error data and the subject classification error data.

12. The system of claim 11, wherein:

(a) the content aggregation and reduction service comprises a first neural network that performs the interrogative analysis;

(b) the content aggregation and reduction service comprises a second neural network that performs the subject classification analysis; and (c) the step of refining the one or more neural networks further comprises the operations of (i) feeding the interrogative error data through the first neural network as a first error signal, and (ii) feeding the subject classification error data through the second neural network as a second error signal.

13. The system of claim 11, wherein the at least one neural network comprises a convolutional neural network.

14. The system of claim 13, wherein the convolutional neural network (a) comprises at least three hidden layers, and (b) performs operations that implement a Latent Dirichlet Allocation model.

15. The system of claim 11, wherein the at least one neural network comprises a recurrent neural network.

16. The system of claim 15, wherein the at least one recurrent neural network comprises a long short-term memory neural network architecture.

17. The system of claim 11, wherein the one or more integrated software applications perform the further operations comprising:

(a) processing the interrogative data by performing a sentiment analysis to generate a first sentiment data set;

(b) performing a labelling analysis on the transcribed content data to generate annotated sentiment data;

(c) generating sentiment error data by applying the first sentiment data set against the annotated sentiment data; and wherein (d) the step of refining the one or more neural networks further comprises the operations of (i) feeding the sentiment error data through the one or more neural networks, and (ii) adjusting the weighting coefficients to minimize the sentiment error data.

18. A method for training a neural network that performs filtering and display of content data comprising the operations of:

(a) processing content data by a content aggregation and reduction service by performing an interrogative analysis utilizing one or more neural networks, wherein (i) each neural network has at least one hidden layer, (ii) the at least one hidden layer comprises a plurality of nodes with each node comprising at least one weighting coefficient, and wherein (iii) the interrogative analysis generates a first interrogative data set comprising one or more interrogatories, source identifier data for each of the interrogatories, and source weighting data for each source identifier, (b) processing the content data by the content aggregation and reduction service by performing a subject classification analysis utilizing the one or more neural networks, wherein the subject classification analysis generates a first subject classification data set comprising (i) subject identifier data, and (ii) subject weighting data for each subject identifier;

(c) performing a labelling analysis on the received content data to generate (i) annotated interrogative data comprising one or more known interrogatories, a known source identifier for each of the known interrogatories, and known source weighting data for each source identifier, and (ii) annotated subject classification data comprising known subject identifier data and known subject weighting data for each subject identifier;

(d) generating an interrogative error data and subject classification error data, by performing operations comprising (i) applying the first interrogative data set against the annotated interrogative data to generate the interrogative error data, and (ii) applying the first subject classification data set against the annotated subject classification data to generate the subject classification error data;

(e) refining the one or more neural networks by performing operations comprising (i) feeding the interrogative error data and the subject classification error data through the one or more neural networks, and (ii) adjusting the weighting coefficients to minimize the interrogative error data and the subject classification error data.

19. The method of claim 18, wherein:

(a) the content aggregation and reduction service comprises a first neural network that performs the interrogative analysis;

(b) the content aggregation and reduction service comprises a second neural network that performs the subject classification analysis; and (c) the step of refining the one or more neural networks further comprises the operations of (i) feeding the interrogative error data through the first neural network as a first error signal, and
(ii) feeding the subject classification error data through the second neural network as a second error signal.

20. The method of claim 18, wherein the at least one neural network comprises a convolutional neural network.

* * * * *